United States Patent
Kawamoto et al.

(10) Patent No.: US 10,694,055 B2
(45) Date of Patent: Jun. 23, 2020

(54) INFORMATION PROCESSING DEVICE AND PROGRAM FOR REMOTE BROWSER OPERATION

(71) Applicant: Konica Minolta, Inc., Chiyoda-ku, Tokyo (JP)

(72) Inventors: Masayuki Kawamoto, Amagasaki (JP); Hikaru Muto, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 100 days.

(21) Appl. No.: 15/691,367

(22) Filed: Aug. 30, 2017

(65) Prior Publication Data

US 2018/0069972 A1 Mar. 8, 2018

(30) Foreign Application Priority Data

Sep. 2, 2016 (JP) .................................. 2016-171947

(51) Int. Cl.
*G06F 17/00* (2019.01)
*H04N 1/00* (2006.01)
*H04L 29/08* (2006.01)
*H04L 29/14* (2006.01)

(52) U.S. Cl.
CPC ......... *H04N 1/00464* (2013.01); *H04L 67/02* (2013.01); *H04L 67/025* (2013.01); *H04L 67/34* (2013.01); *H04L 67/36* (2013.01); *H04L 69/40* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 7,805,136 B1 * | 9/2010 | Everson ................ H04L 67/125 370/338 |
| 8,805,094 B2 * | 8/2014 | Prasad ................. G06K 9/6263 382/159 |
| 9,262,396 B1 * | 2/2016 | Rodriguez Valadez ..................... G06F 11/3684 |
| 9,578,084 B2 * | 2/2017 | Sakiyama ............. G06F 3/1203 |
| 2008/0208816 A1 * | 8/2008 | Eves .................... G06F 16/9577 |
| 2012/0226742 A1 | 9/2012 | Momchilov et al. |

(Continued)

FOREIGN PATENT DOCUMENTS

| JP | 2003-256317 A | 9/2003 |
| JP | 2012-063813 A | 3/2012 |

(Continued)

OTHER PUBLICATIONS

Notice of Reasons for Refusal, Japanese Patent Application No. 2016-171947, Notice of Reasons for Refusal dated Mar. 11, 2020, with translation, 10 pages.

*Primary Examiner* — Mustafa A Amin
(74) *Attorney, Agent, or Firm* — Squire Patton Boggs (US) LLP

(57) ABSTRACT

An information processing device in which a first browser is installed, includes a hardware processor that determines whether or not displaying of a web page by the first browser conforms to predetermined criteria, and when the displaying does not conform to the criteria, remotely operates a second browser installed in an information terminal, and remotely operates the second browser to cause the second browser to display the web page.

30 Claims, 23 Drawing Sheets

(56) References Cited

U.S. PATENT DOCUMENTS

| | | | |
|---|---|---|---|
| 2012/0311430 A1* | 12/2012 | Seo | H04N 21/4126 715/234 |
| 2013/0104060 A1* | 4/2013 | Chandra | G06F 16/957 715/760 |
| 2013/0246509 A1* | 9/2013 | Sakiyama | G06F 3/1203 709/203 |
| 2014/0132978 A1 | 5/2014 | Lgawa | |
| 2014/0149995 A1* | 5/2014 | Tian | G06F 9/54 719/313 |
| 2014/0164605 A1 | 6/2014 | Bae | |
| 2014/0189491 A1* | 7/2014 | Saar | G06F 17/2288 715/234 |
| 2015/0242381 A1* | 8/2015 | Oh | H04L 51/066 715/204 |
| 2016/0023111 A1* | 1/2016 | Gregory | G06F 16/951 463/31 |
| 2016/0027399 A1* | 1/2016 | Wilde | G06F 13/382 345/520 |
| 2016/0283606 A1* | 9/2016 | Xiong | G06F 17/211 |

FOREIGN PATENT DOCUMENTS

| | | |
|---|---|---|
| JP | 2013-545164 A | 12/2013 |
| JP | 2014-099047 A | 5/2014 |
| JP | 2015-114844 A | 6/2015 |
| JP | 2015-203958 A | 11/2015 |
| JP | 2016-509277 A | 3/2016 |

\* cited by examiner

FIG. 4
| CONNECTION HISTORY TABLE | | | | 205A |
|---|---|---|---|---|
| URL | BROWSER Ver | FW Ver | SCREEN INFORMATION | |
| www.google.com | 533.1 | G20-10 | 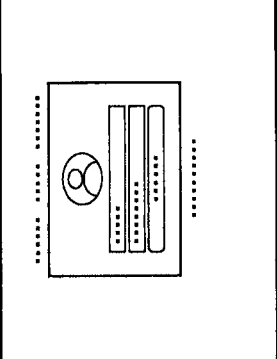 | IM01 |
| www.dropbox.com | 533.1 | G20-20 | 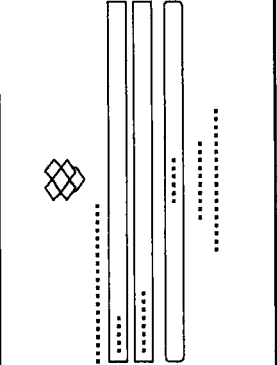 | IM02 |
| www.microsoft.com | 537.1 | G30-10 | 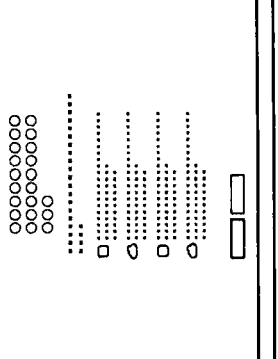 | IM03 |

FIG. 5

| FAILURE URL TABLE | 205B |
|---|---|
| URL | DATE AND TIME |
| www.dropbox.com | 2016.08.01 10:08 |
| : | : |

FIG. 11

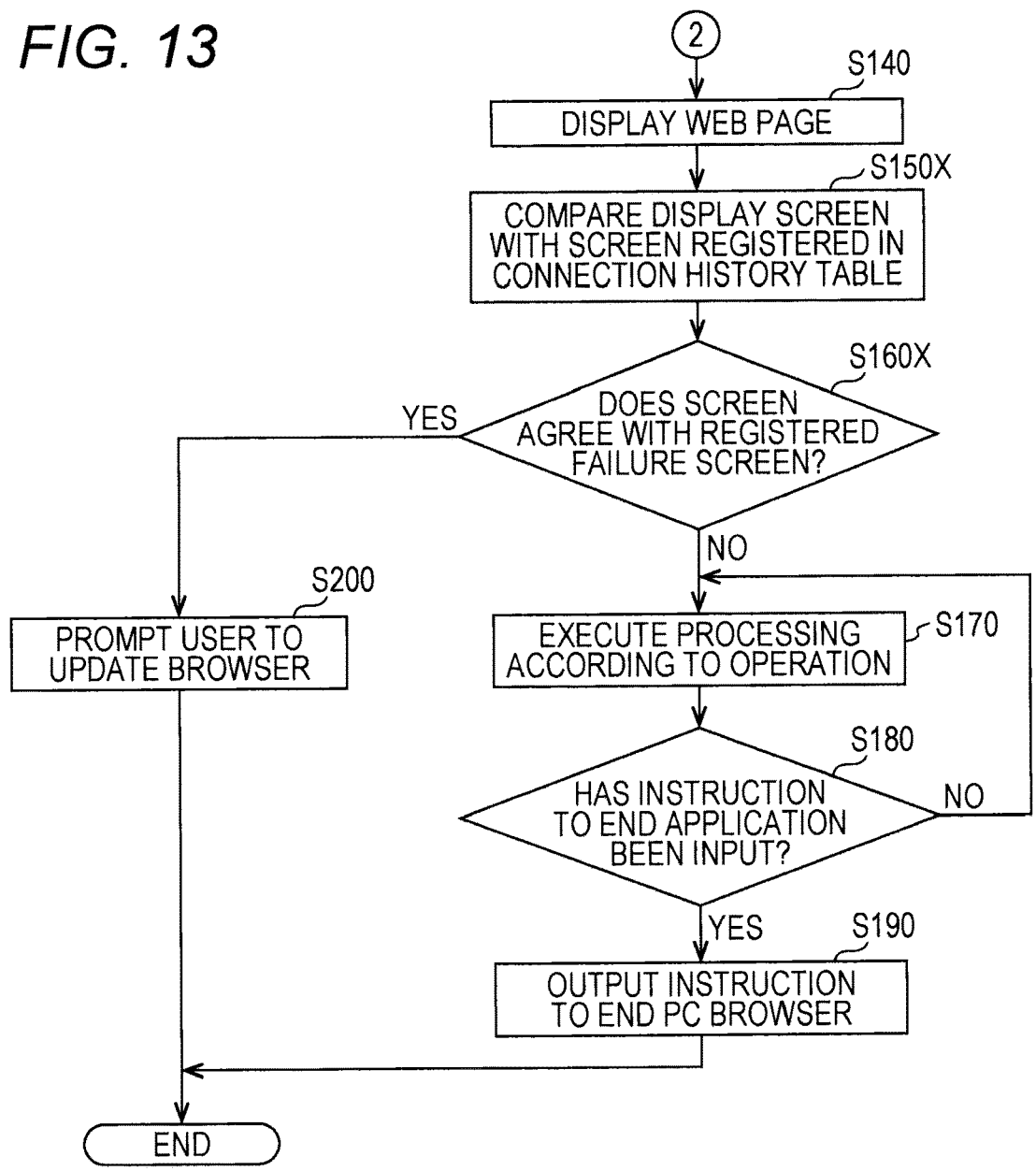

FIG. 25

LOT OF INFORMATION ABOUT HOW TO USE AND ☆ UPGRADE ACCOUNT ⌕ ⊙ minoreta koniga ▼
LOT OF USEFUL INFORMATION! Dropbox Navi

Dropbox  📷 📁 🗄   [SEARCH        ] 🔍

| NAME ▲ | UPDATE | USER WHO IS SHARING |
|---|---|---|
| 📁 Opfo | — | — |
| 📁 20Files | — | — |
| 📁 100Files | — | 🔗 |
| 📁 1000Files | — | — |
| 📁 3000Files | — | — |
| 📁 5000Files | — | — |
| 📁 20151126_Symphony3M2nd_test | — | — |
| 📁 12345678901234567890123456789012...678901234... | — | — |
| 📁 ai | — | — |
| 📁 APP ICON | — | [SHARED ▼] |
| 📁 CN | — | — |

⊙ RECENT
🗎 FILE
👥 TEAM
📄 PAPER
🖼 PHOTOGRAPH
🔗 SHARE
🔗 LINK
📅 EVENT
◉ FILE REQUEST
🗑 DELETED FILES

DO YOU USE Dropbox ON BUSINESS?  ✕

HELP   PRIVACY ...

ND PROGRAM FOR REMOTE BROWSER
INFORMATION PROCESSING DEVICE AND PROGRAM FOR REMOTE BROWSER OPERATION

Japanese Patent Application No. 2016-171947 filed on Sep. 2, 2016, including description, claims, drawings, and abstract the entire disclosure is incorporated herein by reference in its entirety.

BACKGROUND

Technological Field

The present disclosure relates to an information processing device and a program, and in particular, relates to an information processing device in which a browser is installed, and a program that is executed by a computer of the information processing device.

Description of the Related Art

As a kind of information apparatus such as a multi-functional peripheral (MFP), there is an information apparatus in which an application that operates by using a browser (hereinafter also referred to as "application" as appropriate) is installed. Such an application (for example, "bizhub Connector" that is an application made by Konica Minolta, Inc.) is made by a vendor different from an application developer, and operates in conjunction with an external server.

In general, a vendor of a server periodically manages versions of scripts of web pages made by the vendor according to technical trends. As the result, the web pages conform to a main operating system (OS) (for example, Windows, Android, or iOS), and a main browser (for example, internet exploiter (IE), Chrome). When an information apparatus is equipped with a specific OS and/or a specific browser, the OS and/or the browser of the information apparatus are remotely or locally upgraded to the latest versions so as to conform to the latest technical trends. This enables the browser of the information apparatus to maintain an access to an external server.

JP 2015-203958 A discloses an information processing device that is capable of, even when specific print setting information cannot be directly accessed, indirectly editing the setting information. The information processing device communicates with a printer by using a predetermined driver. Moreover, the information processing device displays first setting information and second setting information on a user interface, adds, to the second setting information, an editing instruction flag based on an editing instruction given to the second setting information, and deletes the second setting information, or writes the second setting information to a predetermined storage unit, on the basis of the editing instruction flag added to the second setting information.

However, in JP 2015-203958 A, version upgrade of a web browser is not taken into consideration. When a version of the web browser installed in the information processing device is not properly upgraded, there occurs a situation in which an application, which is installed in the information processing device, and uses the web browser, cannot access a web page of an external server.

SUMMARY

The present disclosure has been devised in consideration of such an actual situation, and an object of the present disclosure is to provide an information processing device.

To achieve the abovementioned object, according to an aspect of the present invention, an information processing device in which a first browser is installed, reflecting one aspect of the present invention comprises a hardware processor that determines whether or not displaying of a web page by the first browser conforms to predetermined criteria, and when the displaying does not conform to the criteria, remotely operates a second browser installed in an information terminal, and remotely operates the second browser to cause the second browser to display the web page.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a drawing specifically illustrating an example of the contents of a connection history table;

FIG. 5 is a drawing specifically illustrating an example of the contents of a failure URL table;

FIG. 11 is a drawing illustrating a modified example of the connection history table;

FIG. 13 is a flowchart illustrating a modified example of the processing shown in FIG. 7;

FIG. 14 is a drawing illustrating an example of the contents of a failure application table;

FIG. 25 is a drawing illustrating an example of a web page after the conversion in a case where the web page shown in FIG. 8 is displayed in each different OS.

DETAILED DESCRIPTION OF EMBODIMENTS

Figure 1:
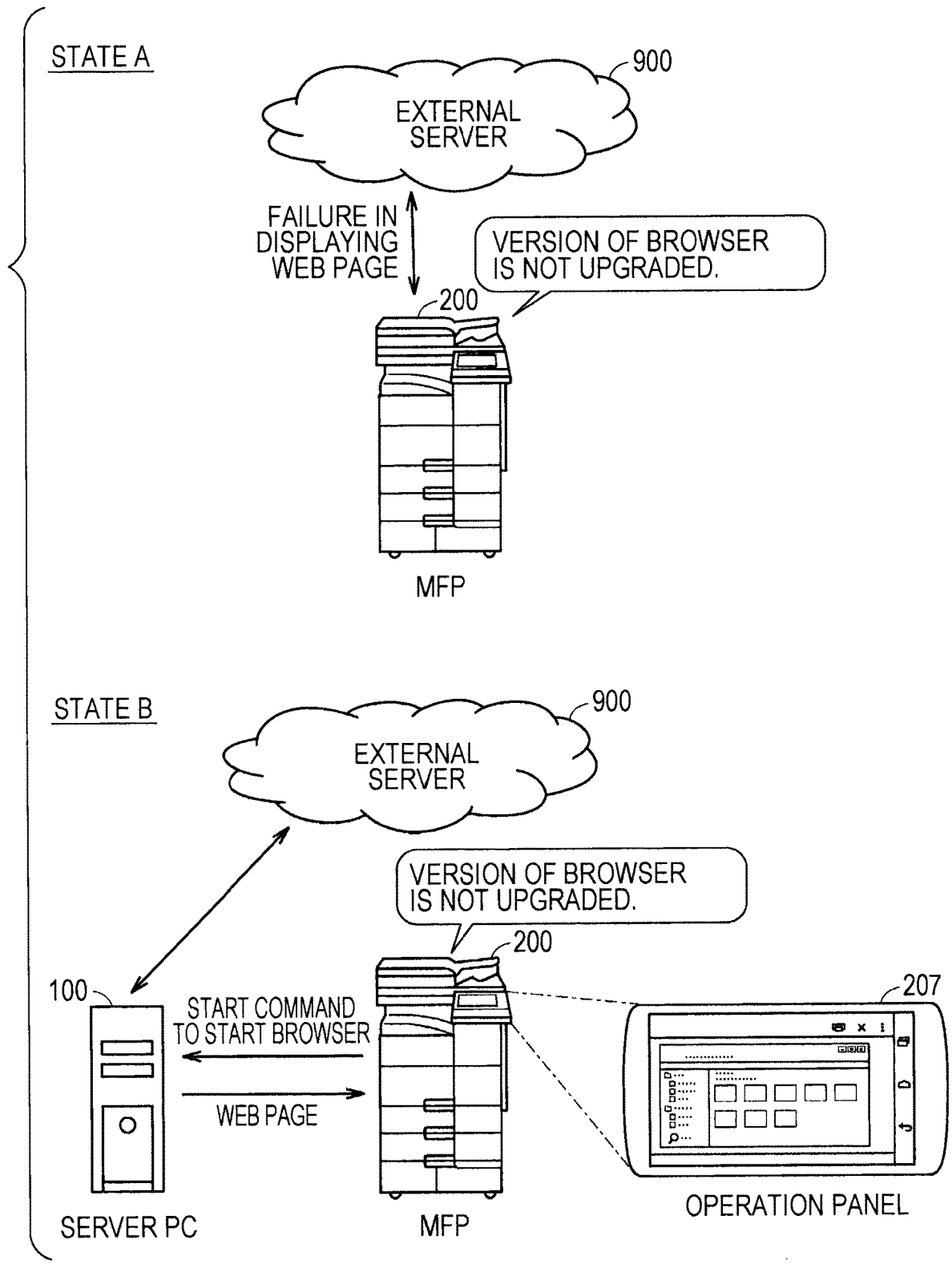
FIG. 1 is a drawing schematically illustrating a configuration of a communication system that includes an information processing device according to an embodiment of the present disclosure.

Hereinafter, one or more embodiments of an information processing device according to the present invention will be described with reference to the drawings. However, the scope of the invention is not limited to the disclosed embodiments. In the following description, identical reference numerals are used to denote identical parts or components. The same applies to the names and functions thereof. Therefore, the explanation thereof will not be repeated.

[Configuration of Communication System]

FIG. 1 is a drawing schematically illustrating a configuration of a communication system that includes an information processing device according to an embodiment of the present disclosure. FIG. 1 illustrates a state A and a state B. In the state A, an MFP 200 that is capable of communicating with an external server 900 is shown. A browser is installed in the MFP 200. The MFP 200 uses the browser to display a web page provided on the external server 900.

When a version of the browser of the MFP 200 is not properly upgraded, there occurs a situation in which the browser of the MFP 200 is not capable of displaying the web page provided on the external server 900. In such a case, as indicated as the state B, the MFP 200 outputs, to a server PC 100, a start command to start the browser. According to this start command, the server PC 100 starts a browser installed in the server PC 100.

A version of the browser installed in the server PC 100 is higher than, for example, the version of the browser of the MFP 200. The browser of the server PC 100 obtains a web page of the external server 900, and then transmits the web page to the MFP 200. On receipt of the web page, the MFP 200 displays the web page by using, for example, the operation panel 207.

In the present disclosure, the MFP 200 is an example of an information processing device, and the server PC 100 is an example of an information terminal.

[Hardware Configuration]

Figure 2:
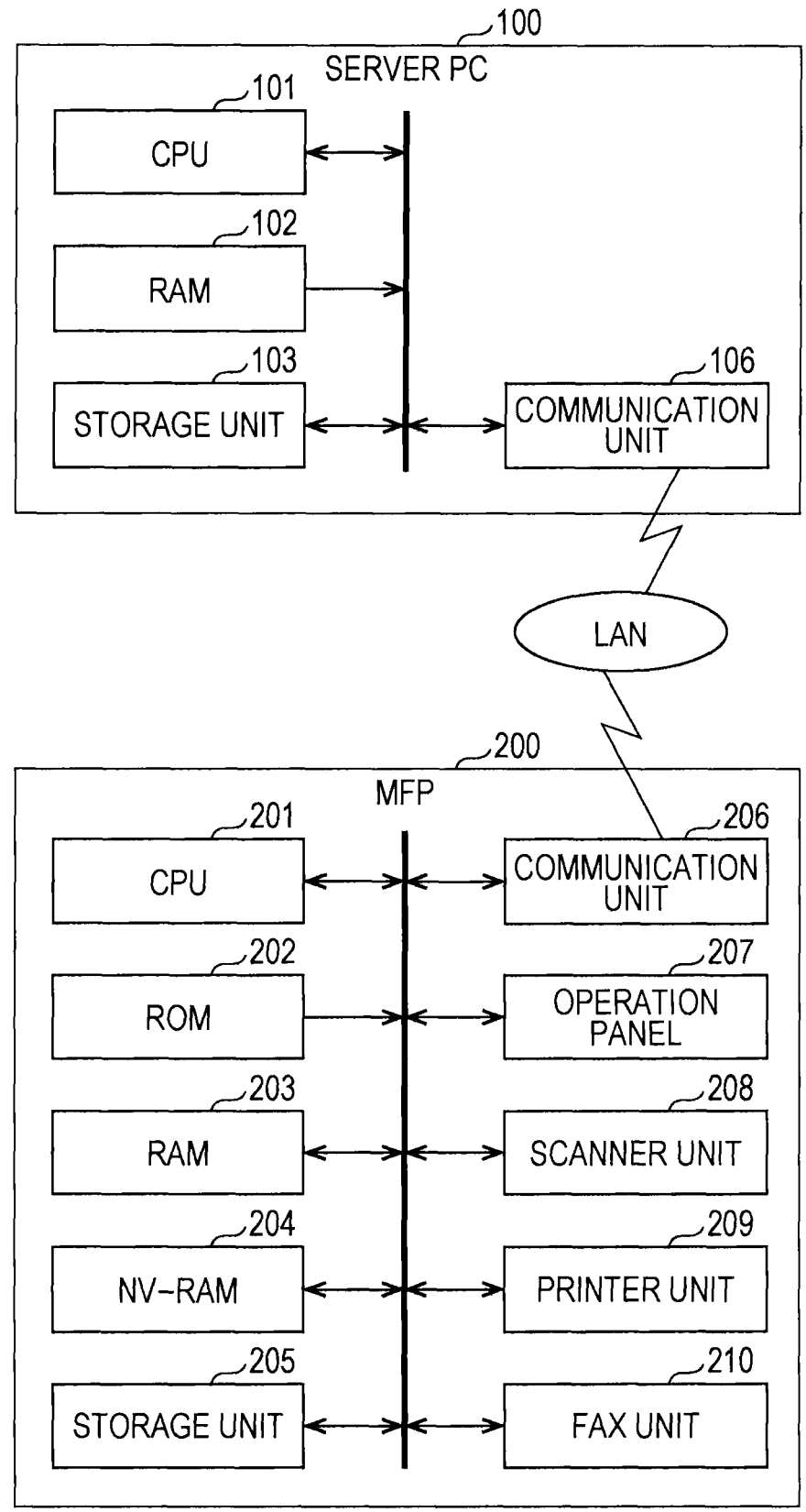
FIG. 2 is a diagram illustrating an example of a hardware configuration composed of a server PC and an MFP shown in FIG. 1.

FIG. 2 is a diagram illustrating an example of a hardware configuration composed of the server PC 100 and the MFP 200 shown in FIG. 1. Respective hardware configurations of the server PC 100 and the MFP 200 will be described below.

(Server PC 100)

As shown in FIG. 2, the server PC 100 includes, as main components, a central processing unit (CPU) 101, a random access memory (RAM) 102, a storage unit 103, and a communication unit 106. The CPU 101, the RAM 102, the storage unit 103 and the communication unit 106 are connected to one another through internal buses.

The CPU 101 is an example of an arithmetic unit that executes processing for controlling the overall operation of the server PC 100 by executing, for example, a program.

The RAM 102 functions as a work area used at the time of executing processing by the CPU 101. The storage unit 103 stores various kinds of data including: various kinds of programs such as an operating system (OS) executed by the CPU 101, and a web browser application; and data used for the execution of these programs. The storage unit 103 is, for example, an electronically erasable programmable read-only memory (EEPROM).

So long as the storage unit 103 is capable of recording a program in a non-temporary manner, the storage unit 103 may be a compact disc-read only memory (CD-ROM), a digital versatile disk-read only memory (DVD-ROM), a universal serial bus (USB) memory, a memory card, a flexible disk (FD), a hard disk, a solid state drive (SSD), a magnetic tape, a cassette tape, a magnetic optical disc (MO), a mini disc (MD), an integrated circuit (IC) card (other than the memory cards), an optical card, a mask ROM, and/or an EPROM. There may be a case where as a recording medium that is attachable/detachable to/from the server PC 100, the storage unit 103 becomes a target of a commercial transaction independently from the server PC 100.

The communication unit 106 is a device for communicating with the MFP 200 and the external server 900, and is realized by, for example, a wireless communication circuit.

(MFP200)

The MFP 200 includes, as main components, a CPU 201, a ROM 202, a RAM 203, an NV-RAM 204, a storage unit 205, a communication unit 206, an operation panel 207, a scanner unit 208, a printer unit 209, and a facsimile (FAX) unit 210. The CPU 201, the ROM 202, the RAM 203, the NV-RAM 204, the storage unit 205, the communication unit 206, the operation panel 207, the scanner unit 208, the printer unit 209 and the FAX unit 210 are connected to one another through internal buses.

The CPU 201 is an example of an arithmetic unit that executes processing for controlling the overall operation of the MFP 200 by executing, for example, a program.

The ROM 202 stores various kinds of data including a program executed by the CPU 201. The RAM 203 functions as a work area used at the time of executing a program by the CPU 201. The RAM 203 may temporarily store, for example, image data read by the scanner unit 208.

The NV-RAM 204 is a nonvolatile memory; and a set value used for the operation of the MFP 200 is held in the NV-RAM 204.

The storage unit 205 stores various kinds of data including destination information registered in the MFP 200, and a document. The document data may be input into the MFP 200 through a network, or may be generated as the result of reading an image by the scanner unit 208 The storage unit 205 is realized by a medium that stores data in a nonvolatile manner, the medium including, for example, an EEPROM, a CD-ROM, a DVD-ROM, a USB memory, a memory card, an FD, a hard disk, an SSD, a magnetic tape, a cassette tape, an MO, an MD, an IC card (other than memory cards), an optical card, a mask ROM, and an EPROM. There may be a case where as a recording medium that is attachable/detachable to/from the MFP 200, the storage unit 205 becomes a target of a commercial transaction independently from the MFP 200.

The communication unit 206 is a device for communicating with the server PC 100 and the external server 900, and is realized by, for example, a network card.

The operation panel 207 includes a touch sensor (input unit), and a display (display unit). The operation panel 207 displays a state of the MFP 200. In addition, the operation panel 207 allows input of various kinds of information (a set value of copy image quality or copying paper, a destination of scanning (destination registration), etc.).

The scanner unit 208 scans an original document that has been set, and then generates image data of the original document. A publicly-known method may be employed as a method for generating image data in the scanner unit 208.

By using, for example, an electrophotographic method, the printer unit 209 converts image data read by the scanner unit 208, print data transmitted from an external information processing device such as the server PC 100, and FAX data received by the FAX unit 210 into data used for printing. In addition, the printer unit 209 prints an image such as a document on the basis of data after the conversion. A publicly-known technique may be employed as a mode of image forming such as an electrophotographic method.

The FAX unit 210 transmits image data read by the scanner unit 208 to an external device via a public line. A publicly-known technique may be employed as a transmission method.

By executing a predetermined program, the CPU 201 is capable of detecting a state of each of components (the scanner unit 208, the printer unit 209, etc.) in the MFP 200. The CPU 201 detects, for example, a state in which the scanner unit 208 and/or the printer unit 209 are currently executing a job, and a state in which a paper jam has occurred in the printer unit 209.

In the MFP 200, the communication unit 206 is capable of communicating in two frequency bands, for example, the 2.4 GHz band and the 5 GHz band. The CPU 201 controls, on a communication destination basis, which frequency band the communication unit 206 uses for communication. The CPU 201 registers information used to manage a communication destination of the communication unit 206 in, for example, the storage unit 205.

[Specific Example of Data to be Used]

Figure 3:
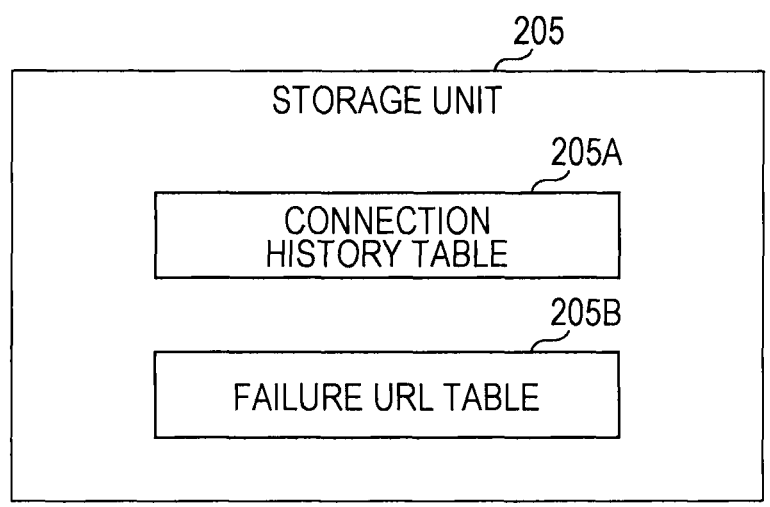
FIG. 3 is a diagram schematically illustrating a kind of history to be stored.

The MFP 200 stores an access history and an access failure history in the storage unit 205. FIG. 3 is a diagram schematically illustrating a kind of history to be stored. As shown in FIG. 3, the storage unit 205 stores a connection history table 205A that indicates an access history of the MFP 200, and a failure URL table 205B that indicates a history of an address at which an access made by the MFP 200 has failed.

(Connection History Table)

FIG. 4 is a drawing specifically illustrating an example of the contents of the connection history table 205A. As shown in FIG. 4, the connection history table 205A associates a uniform resource locator (URL), a version (browser Ver.) of a browser, a version (FW Ver.) of firmware (FW), and screen information with one another.

More specifically, the URL "www.google.com", the browser Ver. "533.1", the FW version "G20-10", and the screen information (screen IM01) are associated with one another. The URL "www.dropbox.com", the browser Ver. "533.1", the FW version "G20-20", and the screen information (screen IM02) are associated with one another. The URL "www.microsoft.com", the browser Ver. "537.1", the FW version "G30-10", and the screen information (screen IM03) are associated with one another.

When the CPU 201 of the MFP 200 obtains a web page, the CPU 201 registers, in the connection history table, the URL of the web page, respective versions of the browser and firmware that have been used to obtain the web page, and screen information (for example, image data of a displayed screen) of the web page.

(Failure URL Table)

FIG. 5 is a drawing specifically illustrating an example of the contents of the failure URL table 205B. As shown in FIG. 5, the failure URL table 205B associates the URL with the date and time. More specifically, the URL "www.dropbox.com" is associated with the date and time "2016.08.01 10:08" (Aug. 1, 2016, 10:08).

When the CPU 201 of the MFP 200 has failed in obtaining a web page or cannot properly display a web page, the CPU 201 registers, in the failure URL table 205B, the URL of the web page, and the date and time at which the obtainment has been tried.

[Process Flow]

Figure 6:
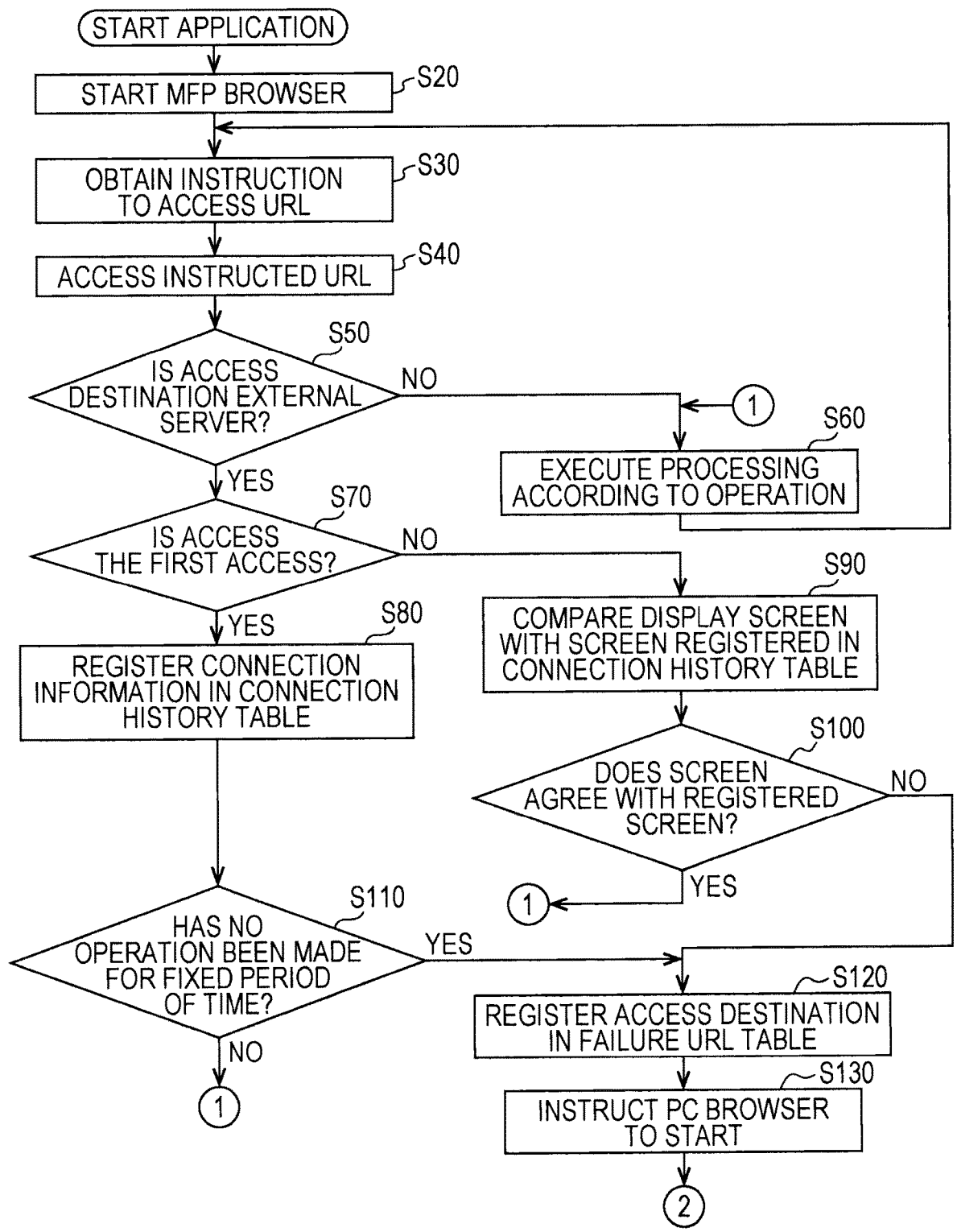
FIG. 6 is a flowchart illustrating an example of processing for executing an application that displays a web page.
Figure 7:
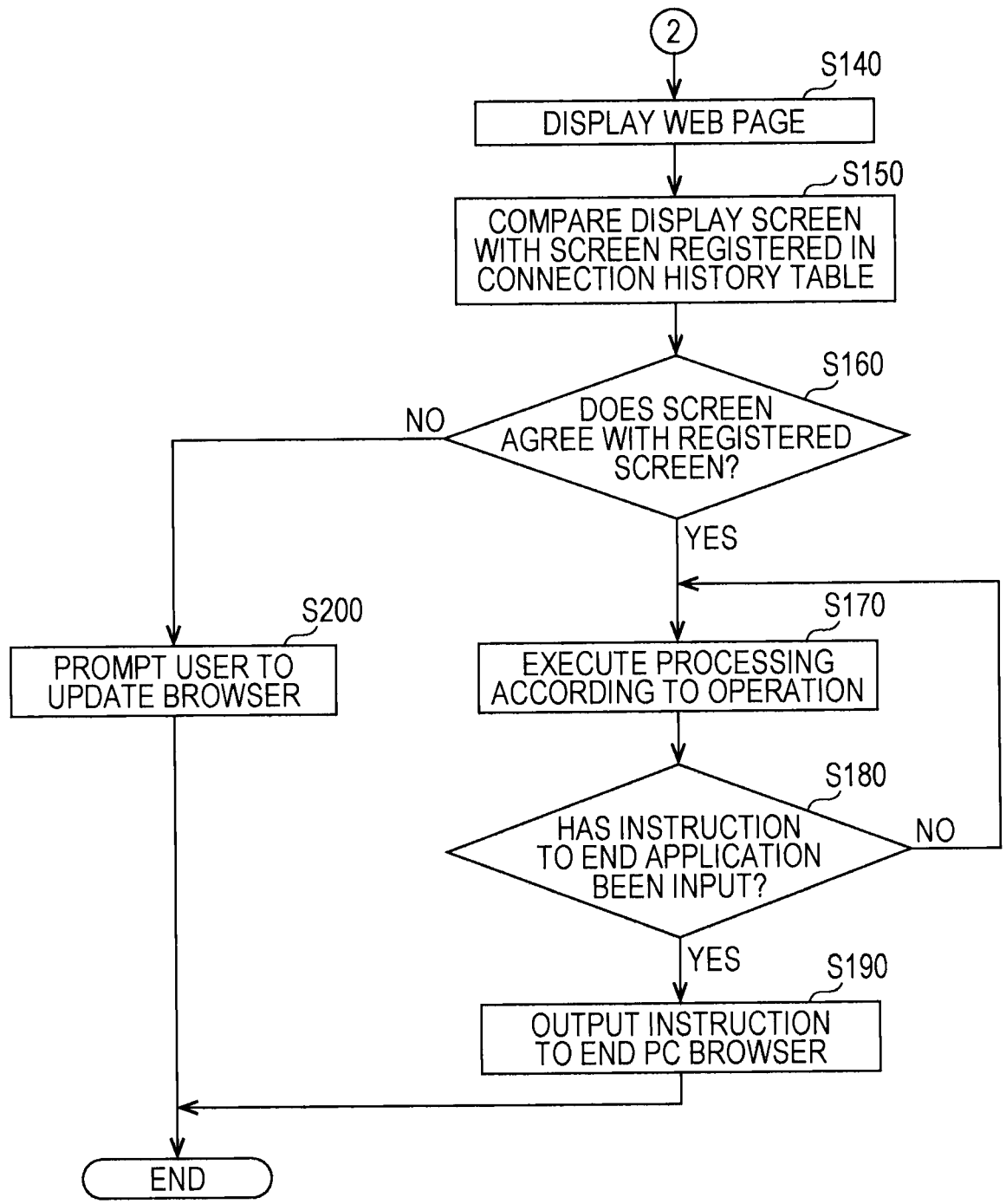
FIG. 7 is a flowchart illustrating an example of processing for executing an application that displays a web page.

FIGS. 6 and 7 are flowcharts each illustrating processing that is executed by the CPU 201 of the MFP 200 to execute an application for displaying a web page. The processing of each of FIGS. 6 and 7 may be implemented as a part of an application, or may be provided, independently from an application, as software that enables an application to have a function of using a browser. The CPU 201 that executes the processing shown in FIGS. 6 and 7 is an example of the remote controller presented in the present disclosure.

First of all, referring to FIG. 6, when the above-described application is started, in a step S20, the CPU 201 starts a browser.

In a step S30, the CPU 201 obtains an instruction to access a certain URL. The instruction is generated according to, for example, user's input operation for an application.

In a step S40, the CPU 201 uses the communication unit 206 (FIG. 2) to access the URL instructed in the step S30.

In a step S50, the CPU 201 determines whether or not the URL accessed in the step S40 identifies a storage area on the external server 900 (FIG. 1). When the determination results in YES, the CPU 201 causes the control to proceed to a step S70. When the determination results in NO, the CPU 201 causes the control to proceed to a step S60. For example, when the URL accessed in the step S40 specifies a storage area in the storage unit 205 of the MFP 200, the CPU 201 causes the control to proceed from the step S50 to the step S60.

In the step S60, the CPU 201 continues the execution of the application according to, for example, the operation by a user, and then returns the control to the step S30.

In the step S70, the CPU 201 determines whether or not the access to the URL in the step S40 is the first access to the URL. For example, when the URL is not registered in the connection history table 205A (FIG. 3), the CPU 201 determines that the access to the URL is the first access. When the result of the determination is the first access, the CPU 201 causes the control to proceed to a step S80. When the result of the determination is not the first access, the CPU 201 causes the control to proceed to a step S90.

In the step S80, the CPU 201 registers, in the connection history table, information about the URL accessed in the step S40. The control then proceeds to a step S110.

In the step S110, the CPU 201 determines whether or not a situation has occurred in which no operation for the application is made for a fixed period of time (for example, one minute). When it is determined that the situation has occurred, the CPU 201 causes the control to proceed to a step S120. When it is determined that the situation has not occurred (in other words, after the web page of the URL accessed in the step S40 is displayed, an instruction for the application has been input within the fixed period of time), the CPU 201 causes the control to proceed to the step S60.

Meanwhile, in the step S90, the CPU 201 compares a screen that is registered in the connection history table as screen information with a screen that is displayed on the operation panel 207 as the result of accessing in the step S40. Subsequently, the control proceeds to a step S100.

In the step S100, the CPU 201 determines whether or not the two screens that have been compared in the step S90 agree with each other. When it is determined that the two screens agree with each other, the CPU 201 causes the control to proceed to the step S60. When it is determined that the two screens do not agree with each other, the CPU 201 causes the control to proceed to the step S120.

Not only the case where the two screens completely agree with each other, but also, for example, when the number of pixels that disagree with the corresponding pixels is the predetermined number or less, the CPU 201 may determine that the two screens agree with each other. When the two screens agree with each other excluding an area in which specific information is displayed, the CPU 201 may determine that the two screens agree with each other. An example of the area in which specific information is displayed is an area for displaying the date and time at which the displaying is executed.

In the step S120, the CPU 201 registers the URL accessed in the step S40 in the failure URL table (FIG. 3). In this case, the date and time at which the access has been tried is also registered in the failure URL table. Subsequently, the control proceeds to a step S130.

In the step S130, the CPU 201 transmits, to the server PC 100, a start command to start the browser. The control then proceeds to a step S140 (FIG. 7). The start command includes an instruction to access the URL accessed by the CPU 201 in the step S40.

Referring to FIG. 7, in the step S140, the CPU 201 obtains a web page (screen information) of the above-described URL from the browser of the server PC 100, and then displays the web page.

In a step S150, the CPU 201 compares a screen that is registered in the connection history table as screen information with a screen that is displayed based on the screen information obtained from the browser of the server PC 100. Subsequently, the control proceeds to a step S160.

In the step S160, as with the step S100, the CPU 201 determines whether or not the two screens that have been compared in the step S150 agree with each other. When it is determined that the two screens agree with each other, the CPU 201 causes the control to proceed to a step S170. When it is determined that the two screens do not agree with each other, the CPU 201 causes the control to proceed to a step S200.

In the step S200, the CPU 201 outputs information that prompts the user to update the browser. As an example, the CPU 201 outputs a message saying that "please upgrade the version of the browser" on the operation panel 207. As another example, the CPU 201 transmits, to the server PC 100, information used to display a message that prompts updating of the version of the browser. Subsequently, the processing shown in FIGS. 6 and 7 ends.

In the step S170, the CPU 201 executes processing according to the user's operation for the application.

In the step S180, the CPU 201 determines whether or not an instruction to end the application has been input by the user's operation. When it is determined that such an instruction has been input, the CPU 201 causes the control to proceed to a step S190. When it is determined that such an instruction has not been input, the CPU 201 returns the control to the step S170.

In the step S190, the CPU 201 outputs information that instructs the server PC 100 to end the browser. As the result, as an example, the server PC 100 ends the browser that has been started according to the instruction in the step S130. Subsequently, the processing shown in FIGS. 6 and 7 ends.

According to the processing shown in FIGS. 6 and 7, as the result of accessing a web page on the external server 900 by the browser of the MFP 200, when a display screen of the web page does not agree with the registered screen (NO in the step S100), or when no operation for the application has been made within a fixed period of time after the web page is displayed (YES in the step S110), the CPU 201 starts a browser of the server PC 100. The CPU 201 starts the browser of the server PC 100 by using, for example, a remote access function.

The disagreement between the display screen of the web page and the registered screen (NO in the step S100) is an example of a state in which displaying of the web page does not conform to predetermined criteria. As another example is that no operation for the application has been made within a fixed period of time after the web page is displayed (YES in the step S110).

(Case where Screen Information Registered in Connection History Table Includes Image of Element)

Figure 8:
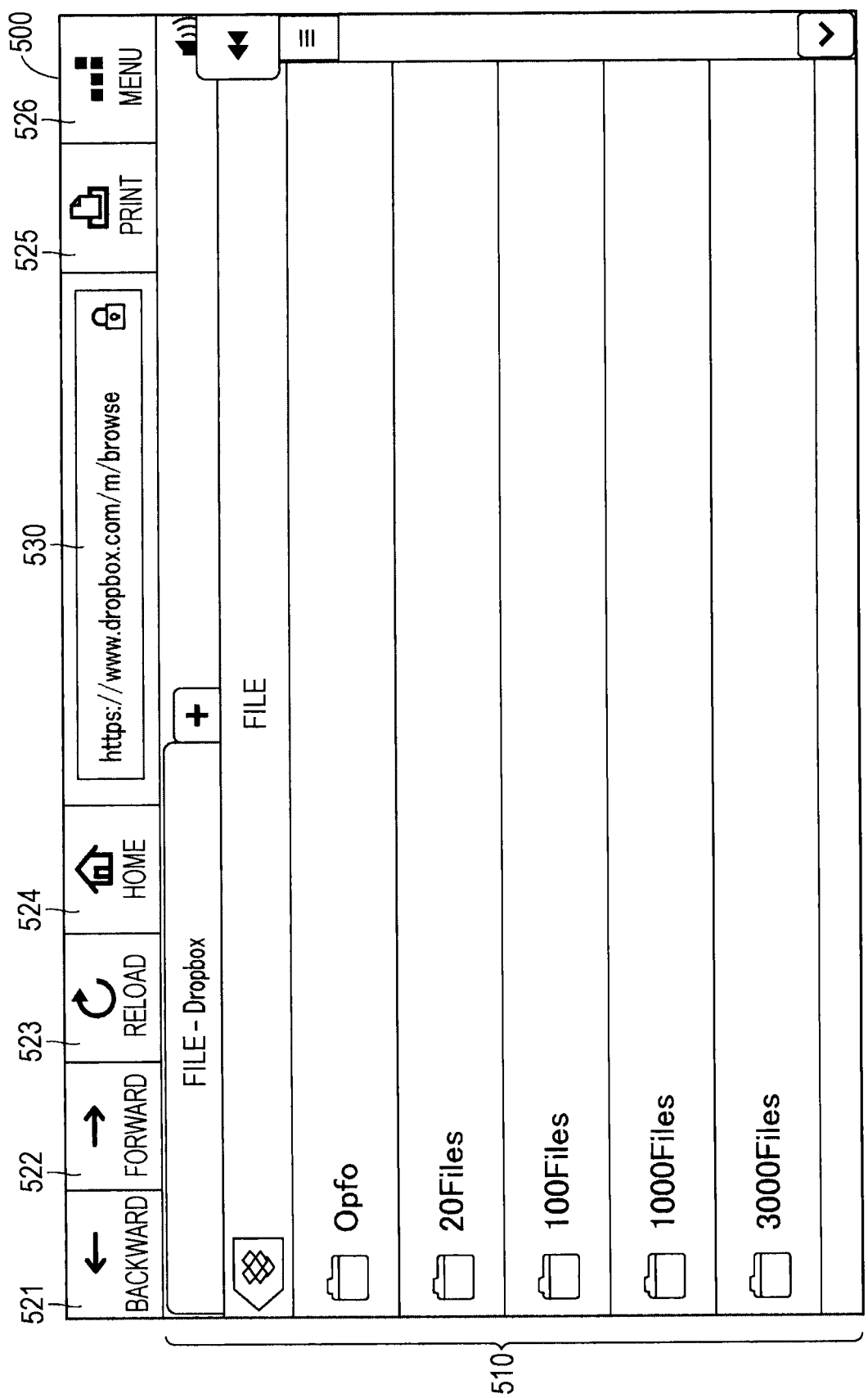
FIG. 8 is a drawing illustrating another example of screen information registered in the connection history table.

The screen information registered in the connection history table may include an image of an element that is displayed by the browser of the MFP 200 irrespective of the contents of a web page, and coordinates at which the element is displayed. FIG. 8 is a drawing illustrating another example of screen information registered in the connection history table.

A screen 500 shown in FIG. 8 includes a web page display area 510, buttons 521 to 526, and a URL display part 530. The buttons 521 to 526 and the URL display part 530 are specific examples of elements specific to the browser. The screen information registered in the connection history table includes images of the buttons 521 to 526, an image of the URL display part 530, and sets of coordinates at which the respective images are displayed.

The browser fits the web page into the web page display area 510. The browser combines the web page display area 510 with the buttons 521-526 and the URL display part 530 to generate the screen 500. The browser displays the generated screen 500 on the operation panel 207.

In the step S90, instead of comparing between the whole screens, which are the screen that is registered in the connection history table as screen information and the screen that is displayed on the operation panel 207 as the result of accessing in the step S40, the CPU 201 may compare the displayed contents and positions of the browser-specific elements between the respective screens. In this case, in the step S100, the CPU 201 determines whether or not the displayed contents and positions of only the elements that have been compared in the step S90 agree with each other.

(Adaptation of Display Screen)

In the step S140, the CPU 201 displays the web page received from the server PC 100 on the operation panel 207. In this case, the CPU 201 may change an image of the web page received from the server PC 100 so as to be adapted to the operation panel 207. An example of the change of the image to be adapted to the operation panel 207 is a change of the size (horizontal to vertical ratio) of the image. Another example is a change of the resolution.

(Transmission of Display Environment Information)

Together with the start command to start the browser in the step S130, the CPU 201 may transmit, to the server PC 100, information (display environment information) that is used to adapt a web page received from the server PC 100 to displaying on the operation panel 207.

Figure 9:
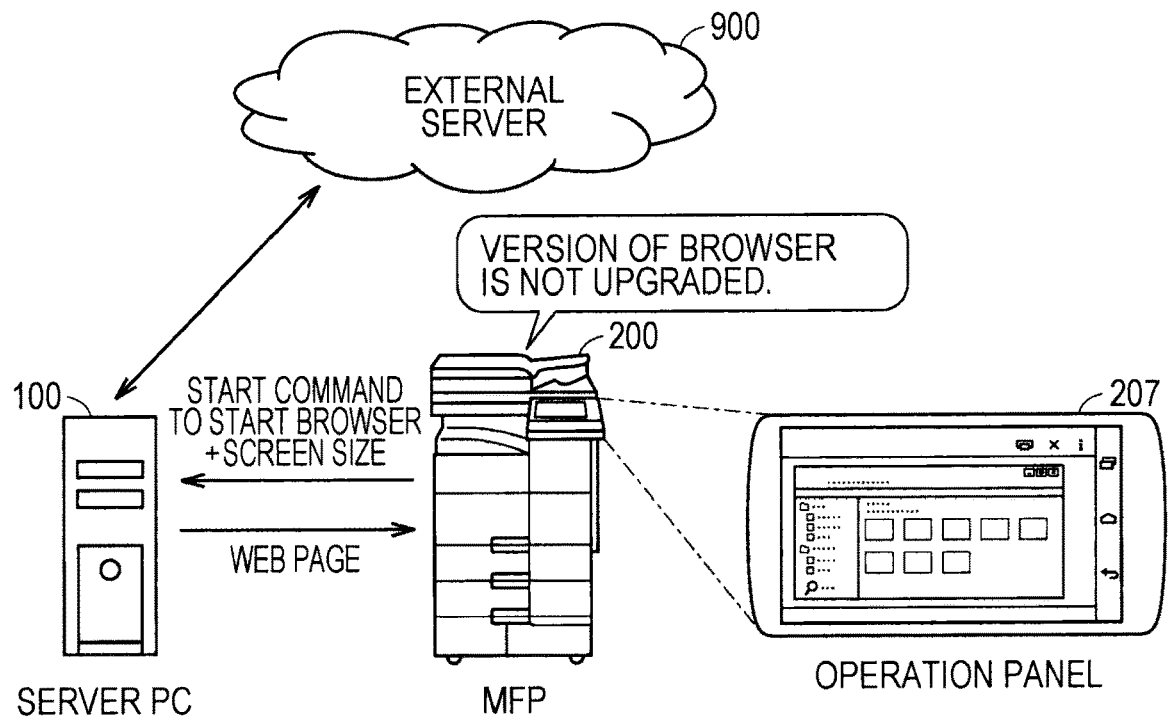
FIG. 9 is a drawing illustrating an example of the transmission of display environment information in the communication system according to an embodiment of the present disclosure.

FIG. 9 is a drawing illustrating an example of the transmission of display environment information in the communication system according to an embodiment of the present disclosure. As shown in FIG. 9, an example of the display environment information transmitted from the MFP 200 to the server PC 100 is information that defines the size of the operation panel 207.

Figure 10:
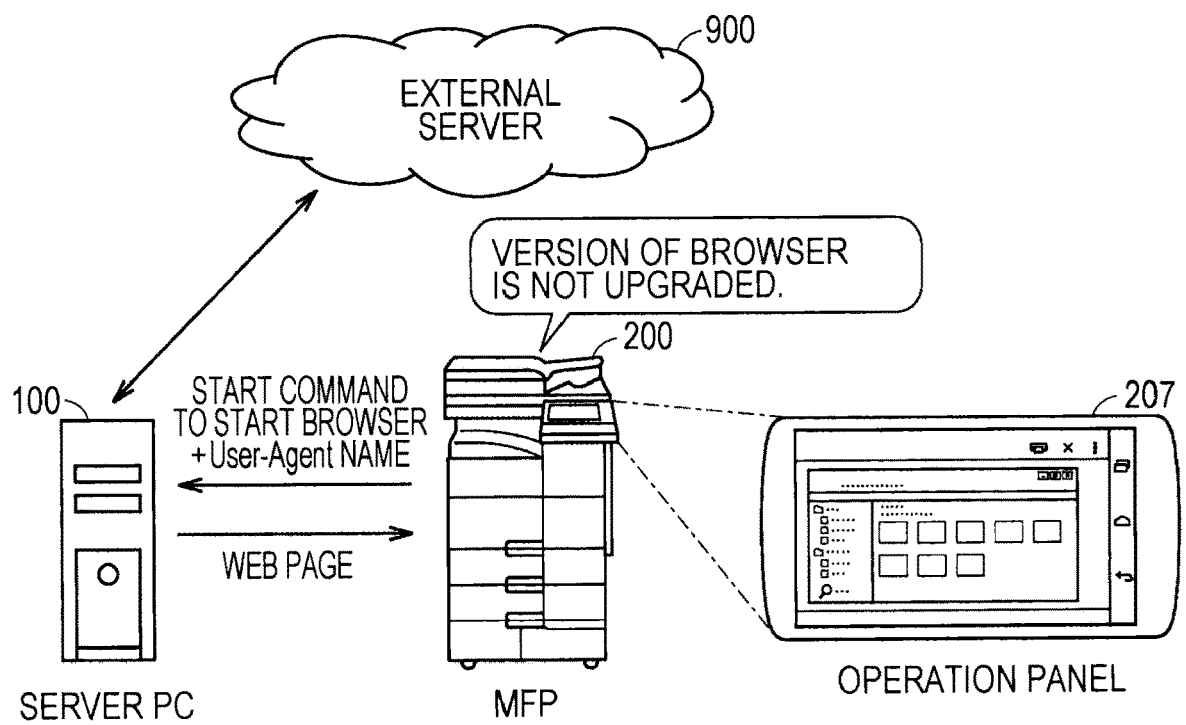
FIG. 10 is a drawing illustrating another example of the transmission of display environment information in the communication system according to an embodiment of the present disclosure.

FIG. 10 is a drawing illustrating another example of the transmission of display environment information in the communication system according to an embodiment of the present disclosure. As shown in FIG. 10, another example of the display environment information transmitted from the MFP 200 to the server PC 100 is a User-Agent name of the browser of the MFP 200.

(Failure Screen Information)

Figure 11:
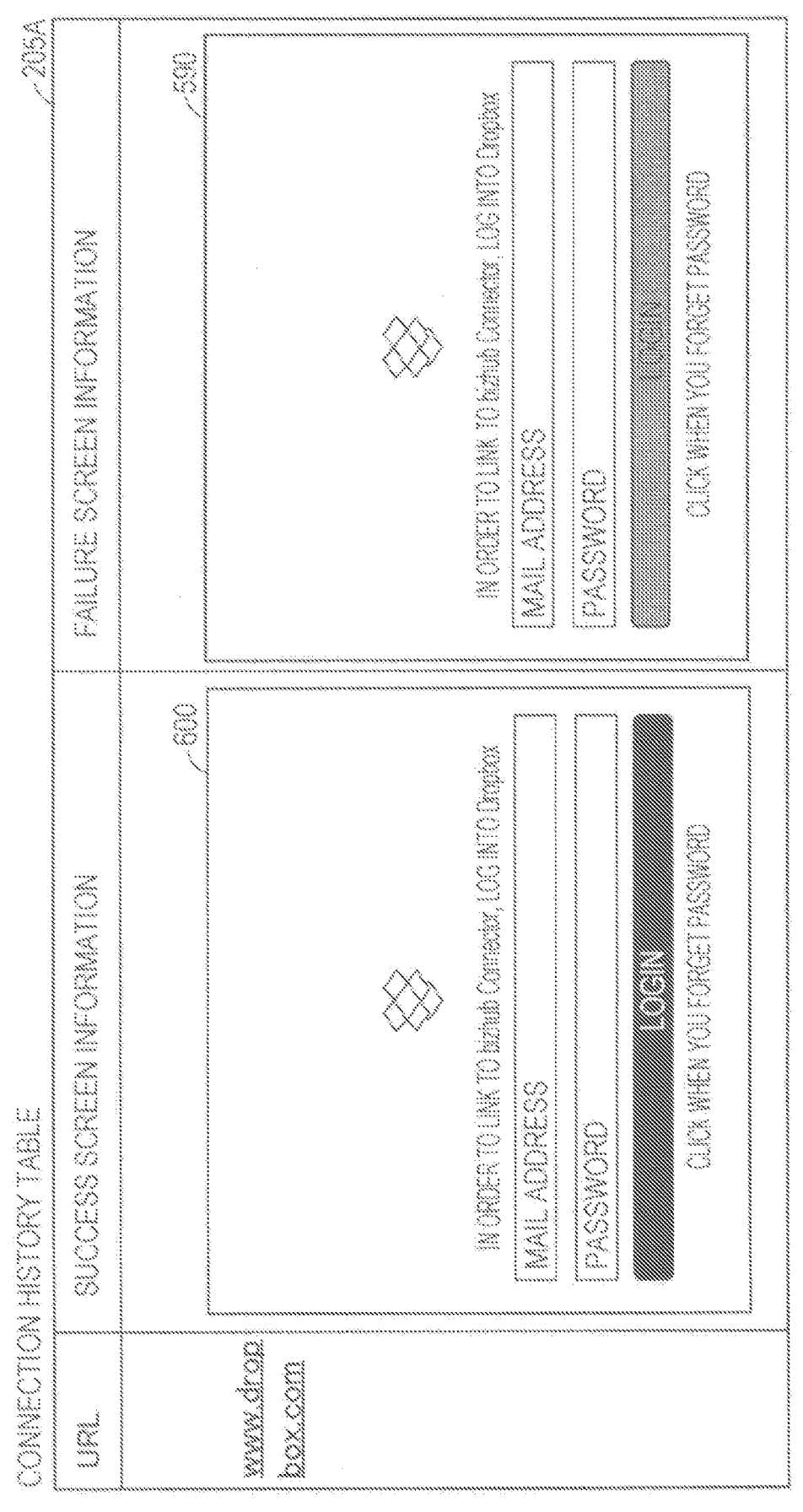

FIG. 11 is a drawing illustrating a modified example of the connection history table 205A. As shown in FIG. 11, not only the URL but also success screen information 600 and failure screen information 590 are registered in the connection history table. The success screen information indicates a state in which a certain web page is being successfully displayed. The failure screen information indicates a state in which displaying of the web page results in failure.

In the example shown in FIG. 11, a screen of the success screen information 600 and a screen of the failure screen information 590 each include a pictorial symbol substantially in the central part thereof, and each further include two input parts (mail address, password), and a login button. The login button of the failure screen information 590 has a color lighter than that of the login button of the success screen information 600.

Figure 12:
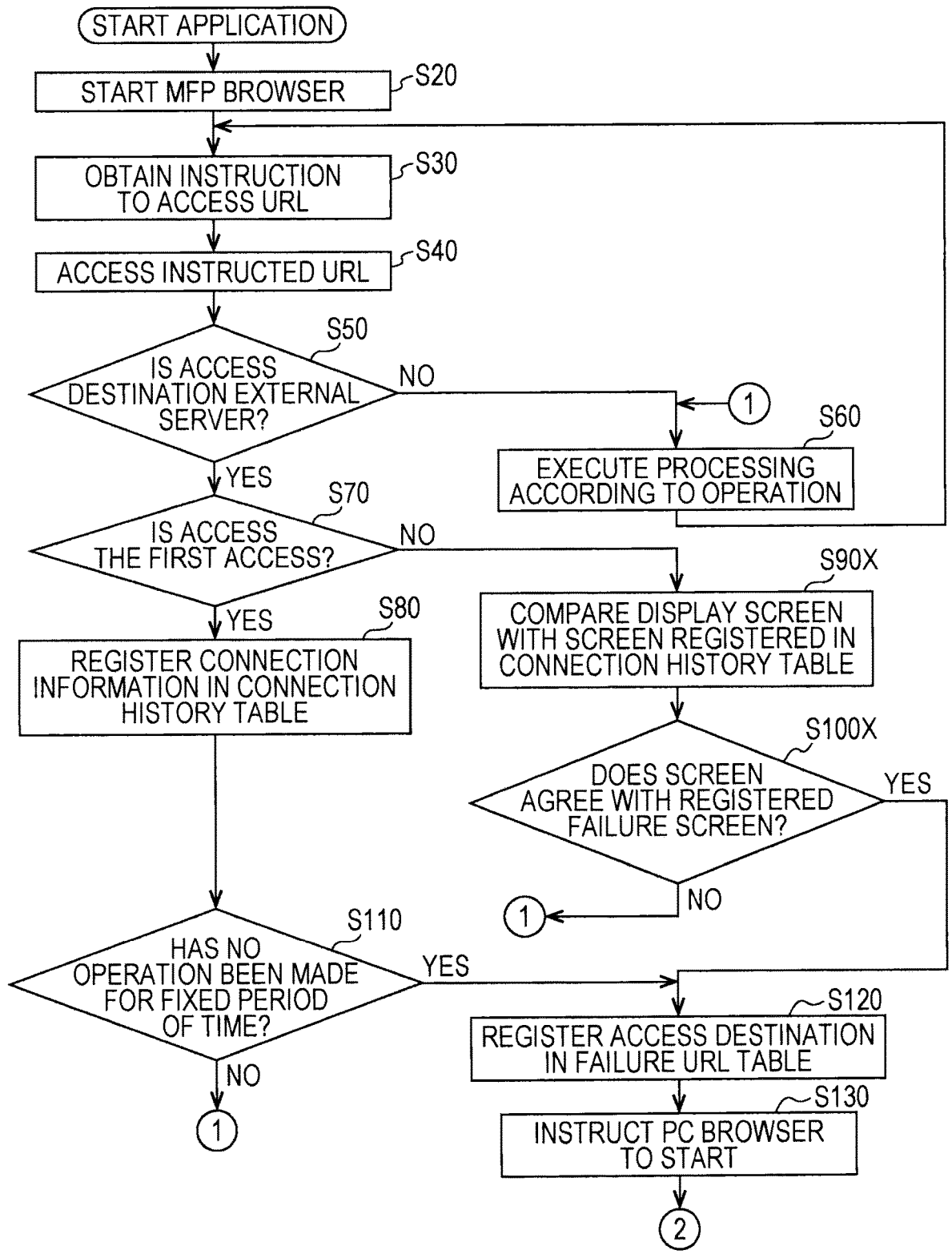
FIG. 12 is a flowchart illustrating a modified example of the processing shown in FIG. 6.

FIG. 12 is a flowchart illustrating a modified example of the processing shown in FIG. 6. Processing shown in FIG. 12 includes steps S90X and S100X as an alternative to the steps S90 and S100 shown in FIG. 6. In the processing shown in FIG. 12, when it is determined that an access to the URL targeted in the step S70 is the first access, the CPU 201 causes the control to proceed to the step S90X.

In the step S90X, the CPU 201 compares a screen displayed as the result of the access with a screen displayed on the basis of the failure screen information.

In the step S100X, when the two screens compared in the step S90X agree with each other, the CPU 201 causes the control to proceed to the step S120. The agreement between the displayed screen and the screen of the failure screen information is an example of a state in which displaying of the web page by the browser meets a given condition. When the two screens compared in the step S90X do not agree with each other, the CPU 201 causes the control to proceed to the step S60.

In other words, in the example shown in FIG. 12, when the color of the login button of the displayed screen is the same as that of the button in the failure screen information 590 (or the color difference therebetween is smaller than the predetermined amount), the browser of the server PC 100 is started. When the color of the login button of the displayed screen differs from that of the button in the failure screen information 590 (or the color difference therebetween is larger than the predetermined amount), the browser of the server PC 100 is started.

In the step S90X, the CPU 201 may compare the screen displayed as the result of the access with an image of the failure screen information and a screen of the success screen information. Moreover, in the step S100X, the CPU 201 may determine which of the steps S60 and S120 the control is caused to proceed to, on the basis of a difference (first difference) between the screen displayed as the result of the access and the image of the failure screen information and a difference (second difference) between the screen displayed as the result of the access and the screen of the success screen information. In this case, when the first difference is larger than or equal to the second difference, in other words, when the screen displayed as the result of the access is closer to the screen of the success screen information than the image of the failure screen information, the CPU 201 causes the control to proceed to the step S60. When the first difference is smaller than the second difference, in other words, when the screen displayed as the result of the access is closer to the screen of the failure screen information than the image of the success screen information, the CPU 201 causes the control to proceed to the step S120.

FIG. 13 is a flowchart illustrating a modified example of the processing shown in FIG. 7. Processing shown in FIG. 13 includes steps S150X and S160X as an alternative to the steps S150 and S160 shown in FIG. 7. The control in the steps S150X and 5160X is similar to the control in the steps S90X and S100X.

In the processing shown in FIG. 13, the CPU 201 displays the web page in the step S140, and then causes the control to proceed to the step S150X. In the step S150X, the CPU 201 compares a screen displayed as a screen of the web page with a screen displayed on the basis of the failure screen information. In the step S160X, when the two screens compared in the step S150X agree with each other, the CPU 201 causes the control to proceed to the step S200. When the two screens compared in the step S150X do not agree with each other, the CPU 201 causes the control to proceed to the step S170.

In the step S150X, the CPU 201 may compare the screen displayed as the screen of the web page with the screen of the success screen information and the screen of the failure screen information. In addition, in the step S160X, the CPU 201 may execute the control according to the results of the above-described comparisons. For example, when the screen displayed as the screen of the web page is closer to the screen of the success screen information than the screen of the failure screen information, the CPU 201 causes the control to proceed to the step S170. When the screen displayed as the screen of the web page is closer to the screen of the failure screen information than the screen of the success screen information, the CPU 201 causes the control to proceed to the step S200.

(Failure Application Table)

When a web page indicated by an instructed URL cannot be normally displayed, the CPU 201 may register an application that has instructed to display the web page of the URL. Such an application is registered in the storage unit 205 as, for example, a "failure application table". FIG. 14 is a drawing illustrating an example of the contents of the failure application table. As shown in FIG. 14, the failure application table includes a name of an application (application name), and the date and time at which the CPU 201 has accessed the instructed URL.

Figure 15:
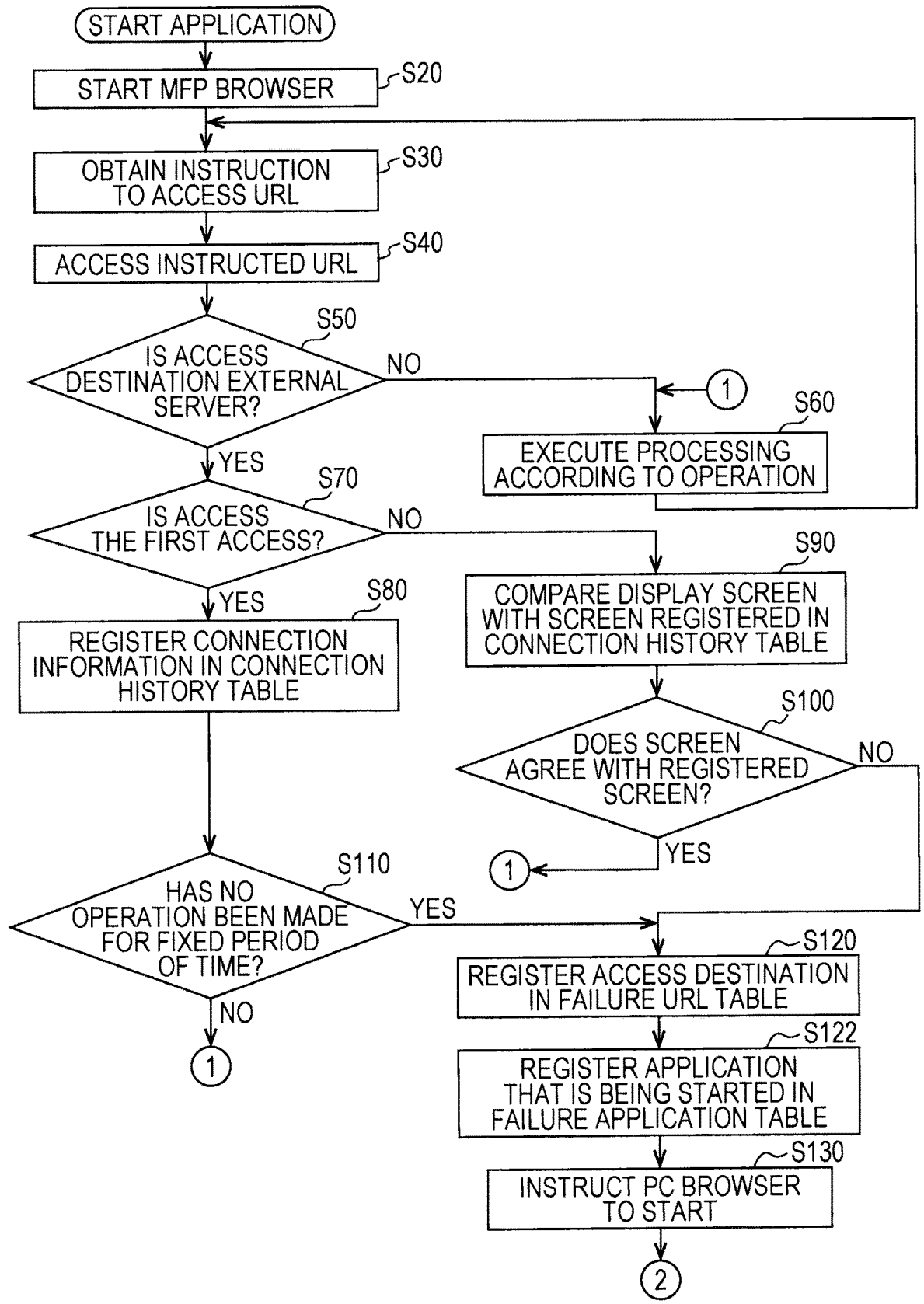
FIG. 15 is a flowchart illustrating a modified example of the processing shown in FIG. 6.

FIG. 15 is a flowchart illustrating a modified example of the processing shown in FIG. 6. In comparison with FIG. 6, the processing shown in FIG. 15 includes a step S122.

As shown in FIG. 15, the CPU 201 registers the URL in the failure URL table in the step S120, and then causes the control to proceed to the step S122. In the step S122, the CPU 201 registers, in the failure application table, the name of the application that is being executed. Subsequently, the control proceeds to a step S130.

Figure 16:
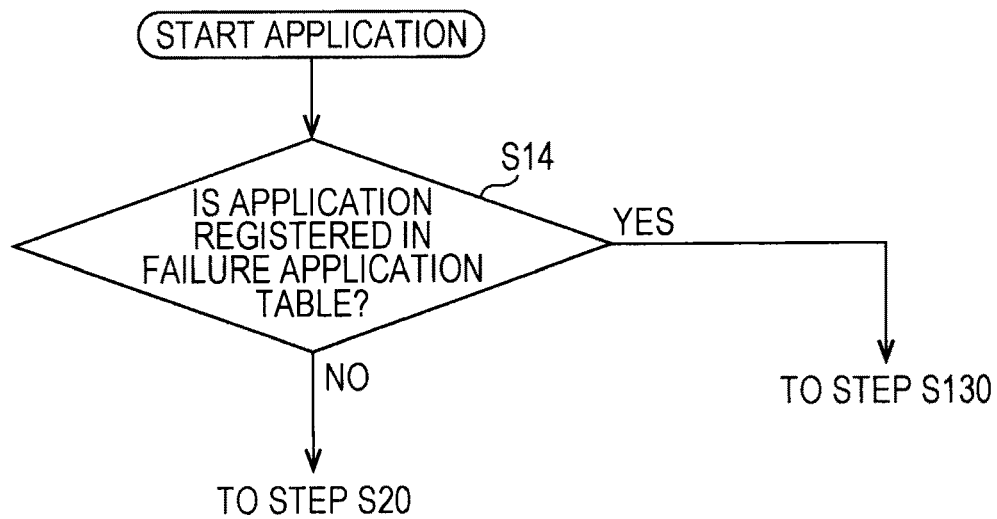
FIG. 16 is a flowchart illustrating a modified example of processing at the time of starting an application.

Information registered in the failure application table is used at the time of, for example, starting an application. FIG. 16 is a flowchart illustrating a modified example of processing at the time of starting an application.

As shown in FIG. 16, when an application is started, the CPU 201 determines whether or not the application to be started is registered in the failure application table. When the application is not registered in the failure application table, the CPU 201 causes the control to proceed to the step S20. When the application is registered in the failure application table, the CPU 201 causes the control to proceed to the step S130. In other words, there is a case where when the application to be started is registered in the failure application table, the CPU 201 instructs the server PC 100 to start the browser without starting the browser of the MFP 200.

(Reference to Failure URL Table)

Figure 17:
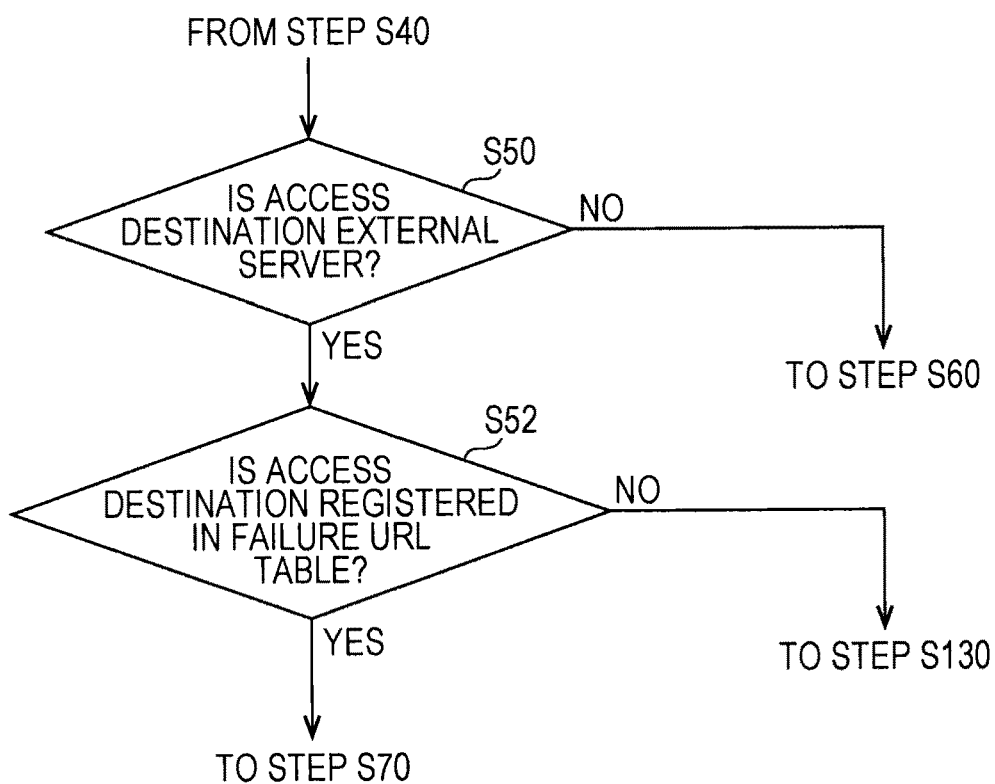
FIG. 17 is a flowchart illustrating a partially modified example of the processing shown in FIG. 6.

FIG. 17 is a flowchart illustrating a partially modified example of the processing shown in FIG. 6. In the processing shown in FIG. 17, when it is determined in the step S50 that the URL accessed in the step S40 identifies a storage area on the external server 900 (YES in the step S50), the CPU 201 causes the control to proceed to a step S52.

In the step S52, the CPU 201 determines whether or not the access destination in the step S40 is registered in the failure URL table (FIG. 3, etc.). When the access destination is not registered in the failure URL table, the CPU 201 causes the control to proceed to the step S70. When the access destination is registered in the failure URL table, the CPU 201 causes the control to proceed to the step S130.

When the CPU 201 accesses the URL registered in the failure URL table, the CPU 201 may output, to the server PC 100, a start command to start the browser, without causing the browser of the MFP 200 to access the URL in the step S40.

(Instruction to End Browser when Application Ends)

When an application that is started in the MFP 200 displays a web page by using a browser, and instructs the server PC 100 to start the browser, the CPU 201 may output, to the server PC 100, an instruction to end the starting of the browser according to a situation in which the application has ended in the MFP 200.

In other words, as shown in FIG. 7, when an instruction to end an application is input in the step S180, the CPU 201 instructs the server PC 100 to end the browser in the step S190.

(Update of Browser in MFP 200)

Figure 18:
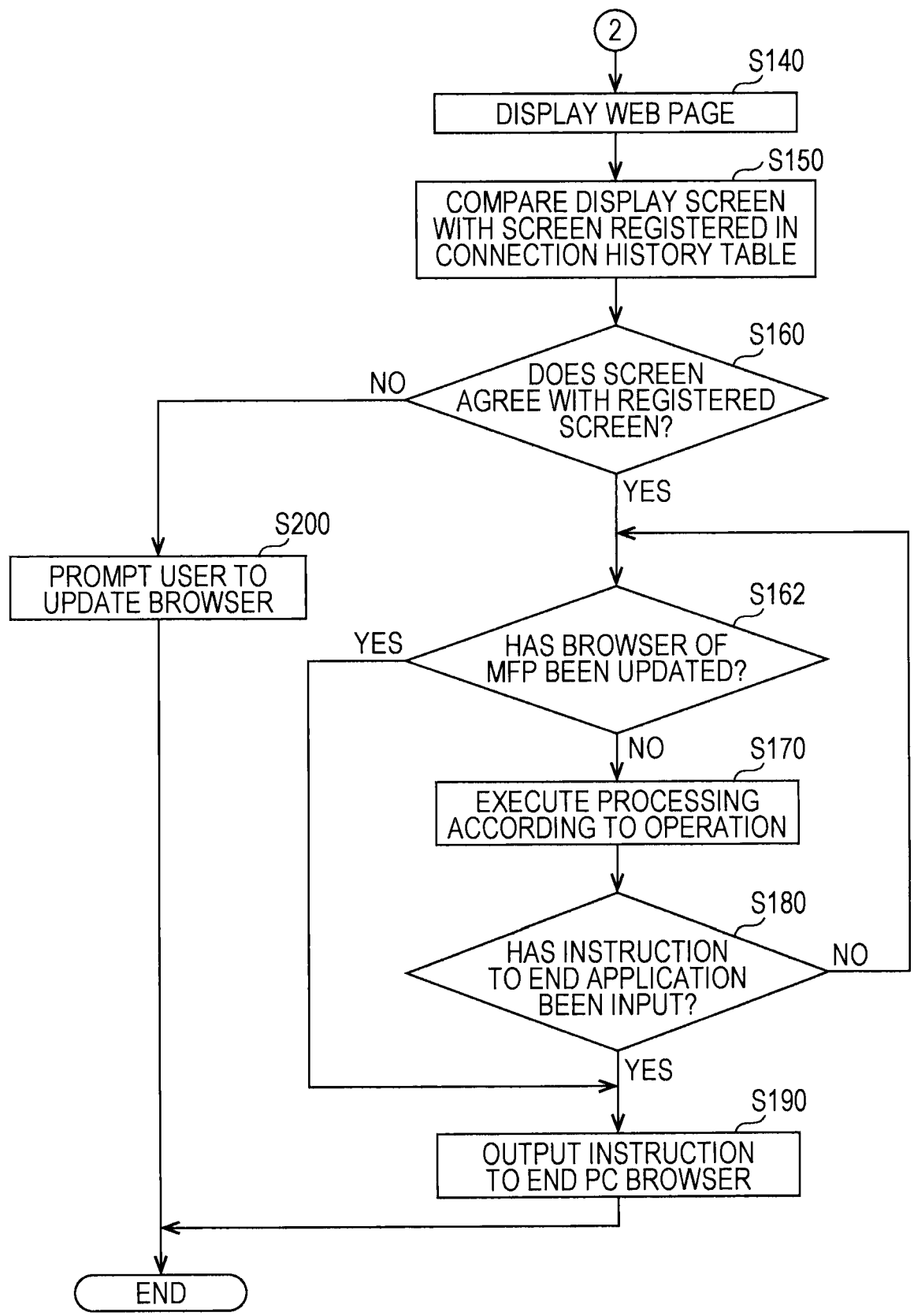
FIG. 18 is a flowchart illustrating a modified example of the processing shown in FIG. 7.

After the CPU 201 instructs the server PC 100 to start the browser, when the browser installed in the MFP 200 is updated (for example, the version is upgraded), the CPU 201 may instruct the server PC 100 to end the browser. FIG. 18 is a flowchart illustrating a modified example of the processing shown in FIG. 7. In addition to the processing shown in FIG. 7, processing shown in FIG. 18 further includes a step S162.

As shown in FIG. 18, when it is determined in the step S160 that the screen of the web page obtained from the server PC 100 agrees with the screen displayed on the bases of the screen information registered in the connection history table, the CPU 201 causes the control to proceed to the step S162.

In the step S162, the CPU 201 determines whether or not the browser of the MFP 200 has been updated. When an update of the browser is not detected, the CPU 201 causes the control to proceed to the step S170. When an update of the browser is detected, the CPU 201 causes the control to proceed to the step S190.

According to the processing shown in FIG. 18, when the browser of the MFP 200 is updated while the browser of the server PC 100 is caused to obtain the web page, the CPU 201 instructs the server PC 100 to end the browser. In other words, the CPU 201 tries to obtain the web page by using the browser of the MFP 200.

(Initial Screen of Browser of Server PC 100)

Figure 19:
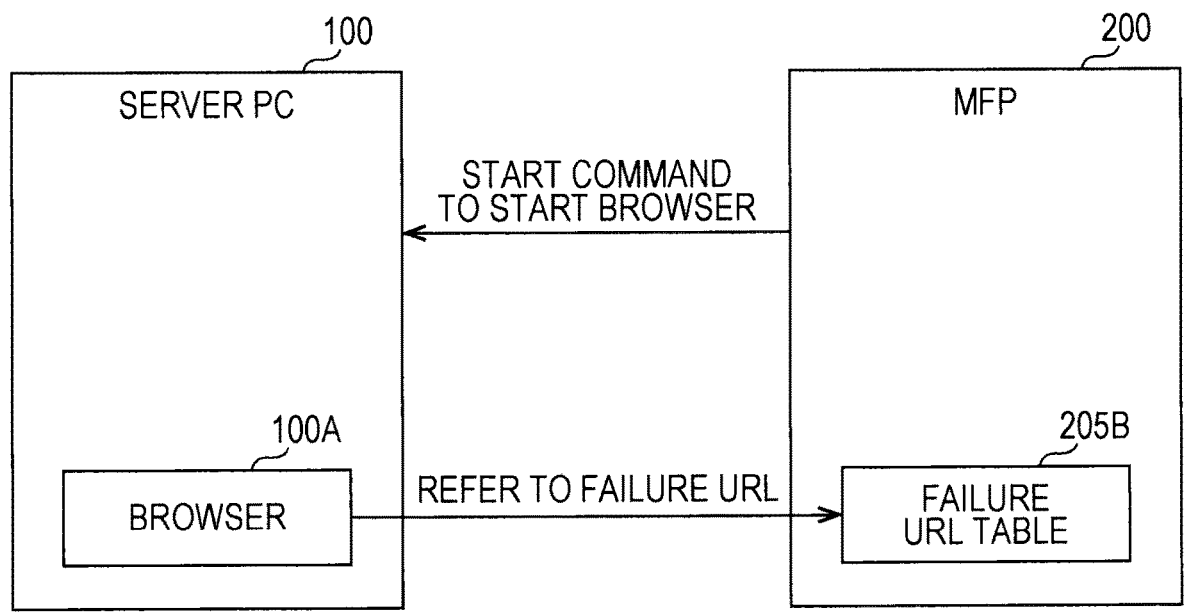
FIG. 19 is a drawing illustrating, as an example, an access destination of an initial screen of a browser on a server PC.

FIG. 19 is a drawing illustrating, as an example, an access destination of an initial screen of a browser on the server PC 100.

It is preferable that the initial screen of the browser of the server PC 100 be set as a URL in the failure URL table (FIG. 5). As the result, the browser of the server PC 100 is set so as to access the URL in the failure URL table (FIG. 5) at the time of starting.

In other words, as shown in FIG. 19, when the server PC 100 is instructed by the MFP 200 to start the browser 100A, the browser 100A refers to the URL registered in the failure URL table 205B in the MFP 200. The URL that is referred to at this time is, for example, the latest URL (the date and time is the latest among the failure URLs). In other words, initial settings of the browser 100A of the server PC 100 are made so as to display the content redirected to the URL that is registered in the failure URL table in the MFP 200. This enables the browser 100A of the server PC 100 to obtain the web page that has not been properly displayed in the MFP 200 without receiving the URL from the MFP 200.

(Third Browser)

Figure 20:
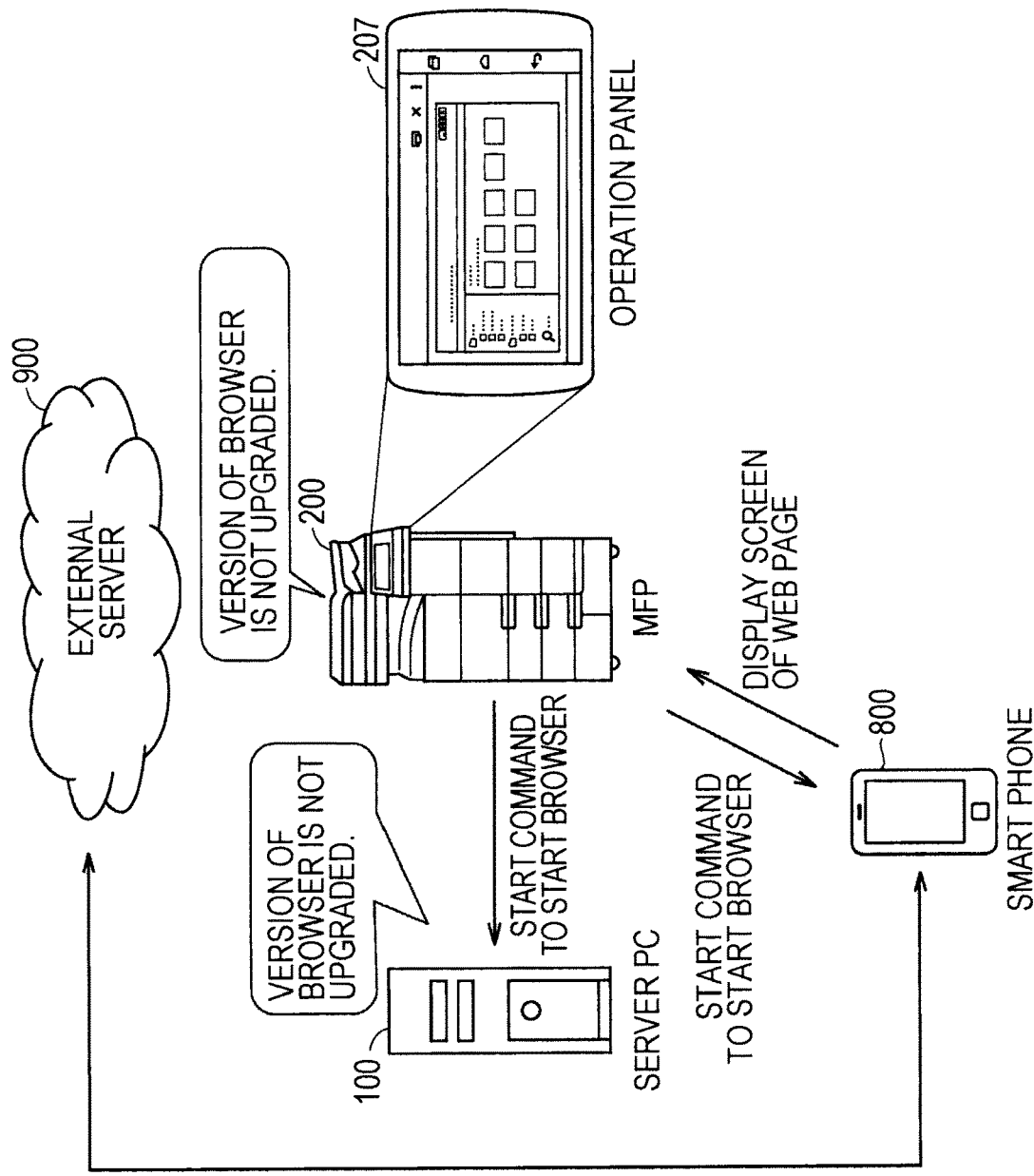
FIG. 20 is a diagram illustrating a configuration of a modified example of the communication system according to an embodiment of the present disclosure.

FIG. 20 is a diagram illustrating a configuration of a modified example of the communication system according to an embodiment of the present disclosure. In comparison with the communication system shown in FIG. 1, the communication system shown in FIG. 20 is further provided with a smart phone 800.

In the communication system shown in FIG. 20, when the web page to be obtained is not properly displayed on the operation panel 207, the MFP 200 instructs the server PC 100 to start the browser. When the web page obtained from the server PC 100 is not properly displayed on the operation panel 207, or when the browser of the server PC 100 is not capable of obtaining the web page, the MFP 200 (the CPU 201 thereof) instructs the smart phone 800 to start the browser.

According to the instruction from the MFP 200, the browser of the smart phone 800 obtains a web page from the external server 900, and then transmits screen information of the web page to the MFP 200. On receipt of the screen information, the CPU 201 of the MFP 200 displays the web page on the operation panel 207.

In the example shown in FIG. 20, the browser of the MFP 200 is an example of a first browser. The browser of the server PC 100 is an example of a second browser. The browser of the smart phone 800 is an example of a third browser.

(Control Based on Load Factor of CPU 201 of MFP 200)

Figure 21:
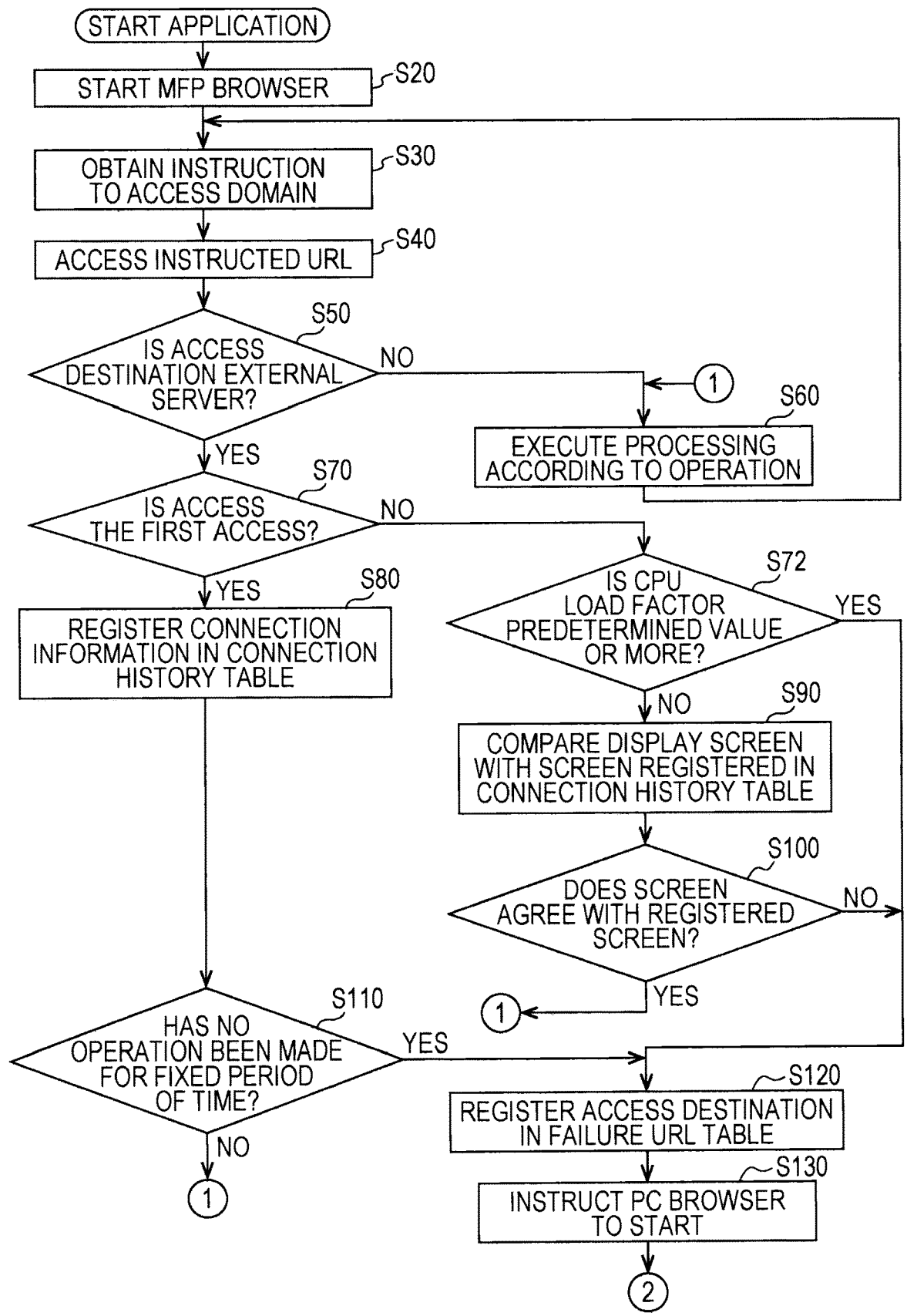
FIG. 21 is a flowchart illustrating a modified example of the processing shown in FIG. 6.

The CPU 201 of the MFP 200 may obtain the web page by using not the browser of the MFP 200 but the browser of the server PC 100 in response to an increase in load factor of the CPU 201. FIG. 21 is a flowchart illustrating a modified example of the processing shown in FIG. 6.

In comparison with the processing shown in FIG. 6, processing shown in FIG. 21 further includes a step S72.

As shown in FIG. 21, when it is determined in the step S70 that the access to the URL in the step S40 is the first access, the CPU 201 causes the control to proceed to the step S72.

In the step S72, the CPU 201 determines whether or not a load factor of the CPU 201 is higher than or equal to a predetermined value. When the load factor of the CPU 201 is higher than or equal to the predetermined value, the CPU 201 causes the control to proceed to the step S120. When the load factor of the CPU 201 is lower than the predetermined value, the CPU 201 causes the control to proceed to the step S90.

According to the processing shown in FIG. 21, when a web page that requires a high load to display the web page is displayed, the CPU 201 instructs the external browser (the browser of the server PC 100) to obtain the web page.

It should be noted that when it is determined in the step S72 that the load factor of the CPU 201 is higher than or equal to the predetermined value, the CPU 201 may cause the control to proceed to not the step S120 but the step S130. In other words, when the CPU 201 instructs the server PC 100 to start the browser on the condition that the load factor of the CPU 201 is high, the CPU 201 is not required to register an access destination in the failure URL table.

(Selection of Browser by User)

Figure 22:
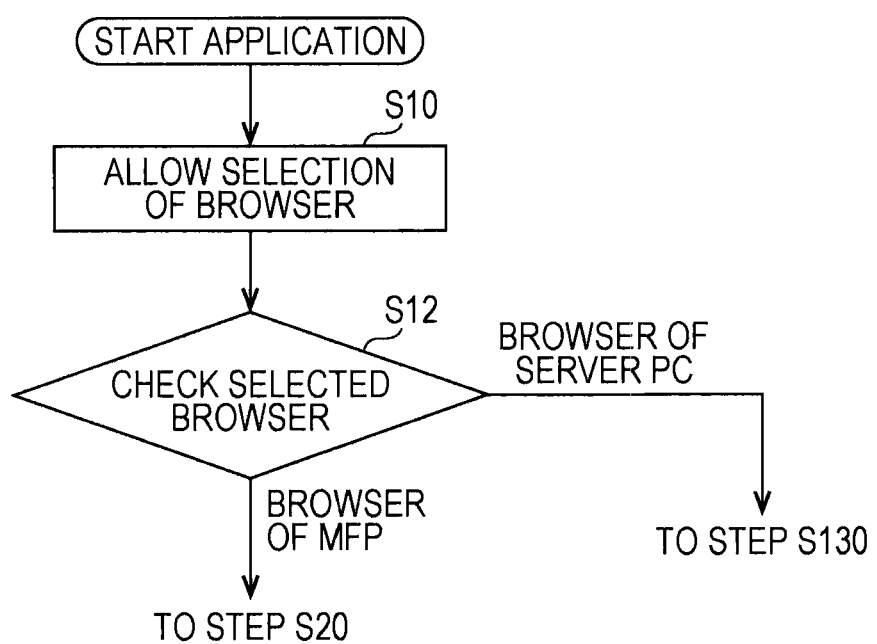
FIG. 22 is a flowchart illustrating a modified example of processing at the time of starting an application in an MFP.
Figure 23:
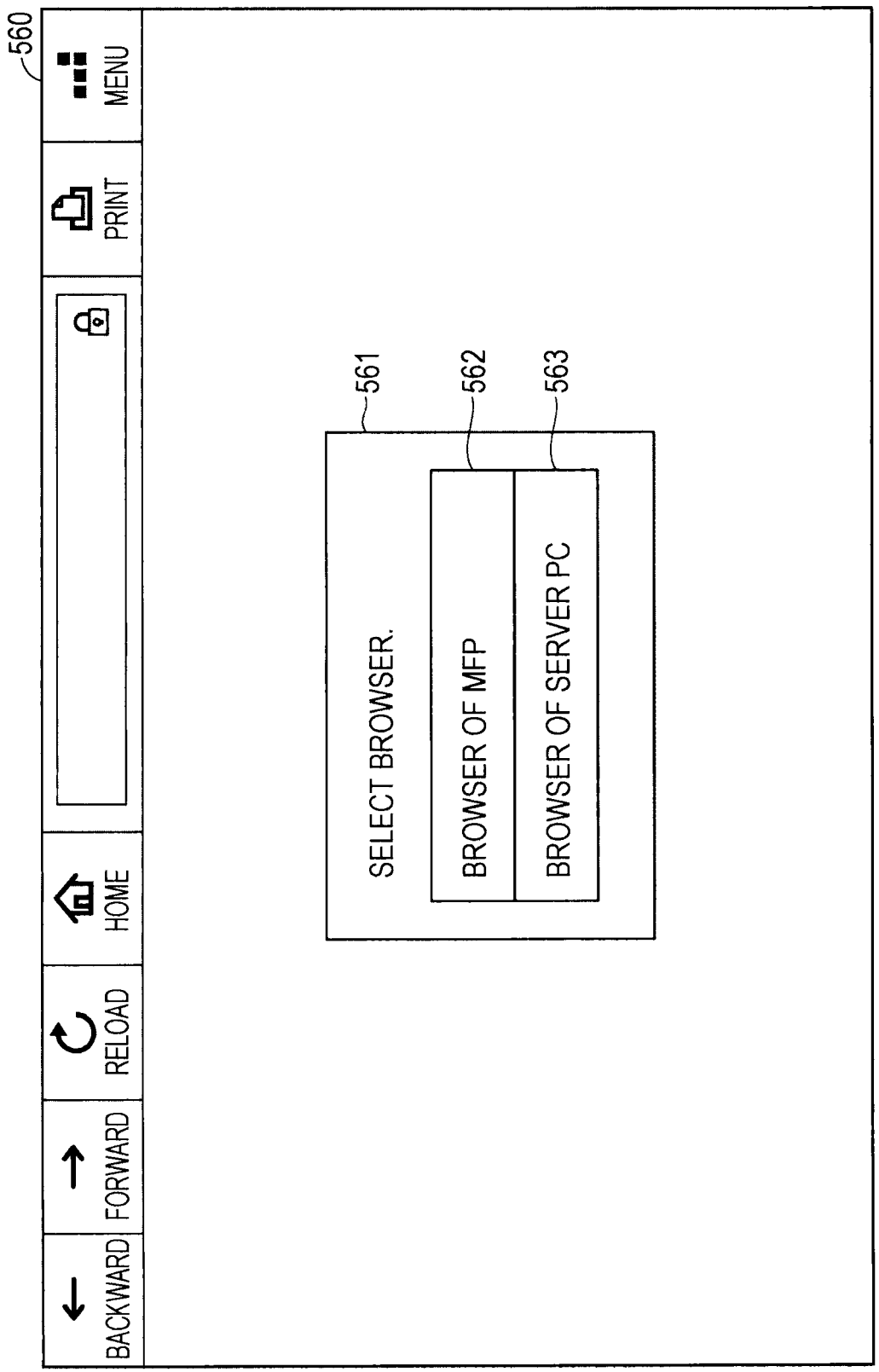
FIG. 23 is a drawing illustrating an example of a screen that is displayed on an operation panel 207 to allow a selection of a browser.

FIG. 22 is a flowchart illustrating a modified example of processing at the time of starting an application in the MFP 200. As shown in FIG. 22, in the step S10, when an application is started, the CPU 201 allows a user to select a browser. FIG. 23 is a drawing illustrating an example of a screen that is displayed on the operation panel 207 to allow a selection of a browser.

A screen 560 shown in FIG. 23 includes a window 561. The window 561 includes: a button 562 for selecting the browser of the MFP 200; and a button 563 for selecting the browser of the server PC 100. The user selects which of the browser of the MFP 200 and the browser of the server PC 100 to start, for example, by operating the button 562 or the button 563.

Returning to FIG. 22, after the step S10, in the step S12, the CPU 201 checks where the selected browser belongs to, the MFP 200 or the server PC 100. When it is determined that the browser of the MFP 200 has been selected, the CPU 201 causes the control to proceed to the step S20 (FIG. 6, etc.). When it is determined that the browser of the server PC 100 has been selected, the CPU 201 causes the control to proceed to the step S130 (FIG. 6, etc.).

(Summary of Processing)

Figure 24:
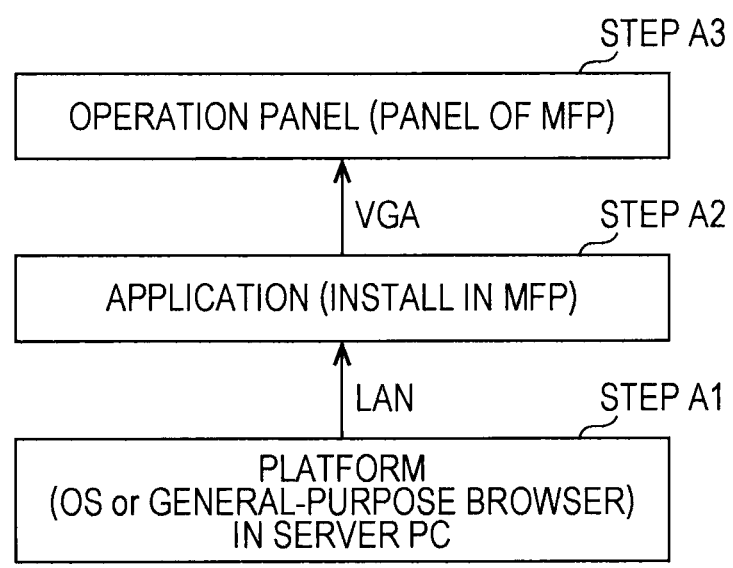
FIG. 24 is a drawing illustrating the transmission of a web page from the server PC to the MFP in the communication system according to an embodiment of the present disclosure.

FIG. 24 is a drawing illustrating the transmission of a web page from the server PC 100 to the MFP 200 in the communication system according to an embodiment of the present disclosure. The transmission includes three steps (steps A1 to A3).

In a communication system according to an embodiment of the present disclosure, the CPU 201 of the MFP 200 instructs the server PC 100 to start the browser. The browser of the server PC 100 obtains a web page that the MFP 200 has tried to obtain. In addition, in the step A1, the browser of the server PC 100 transmits the obtained web page to the MFP 200 through a local area network (LAN) to which the server PC 100 and the MFP 200 belong to.

In the step A2, the CPU 201 that is executing an application in the MFP 200 outputs an image of the obtained web page to the operation panel 207 in, for example, a video graphics array (VGA) format.

In the step A3, the operation panel 207 displays the obtained image.

In the communication system according to the embodiment of the present disclosure, an example of the application executed in the MFP 200 is an application that operates in conjunction with a cloud server such as Dropbox. It is common practice for cloud servers to use OAuth authentication. When the browser of the MFP 200 displays a web page provided on the cloud side, there may arise a problem of being incapable of user authentication. In such a case, the web page of the cloud is obtained by using the browser of the server PC 100. As the result, the web page of the cloud can be displayed in the MFP 200. This enables to avoid making the user uncomfortable.

The storage unit 205 of the MFP 200 may store an IP address of the server PC 100, and an ID and a password that are required to log into the server PC 100. When a display screen of the application is not properly displayed, the above-described IP address is used to instruct the server PC 100 to start the browser.

The MFP 200 and the server PC 100 may be integrally configured. For example, when the MFP 200 and the server PC 100 are connected to the external server 900 through the same router, the router, the MFP 200 and the server PC 100 may be housed in a single housing.

Figure 26:
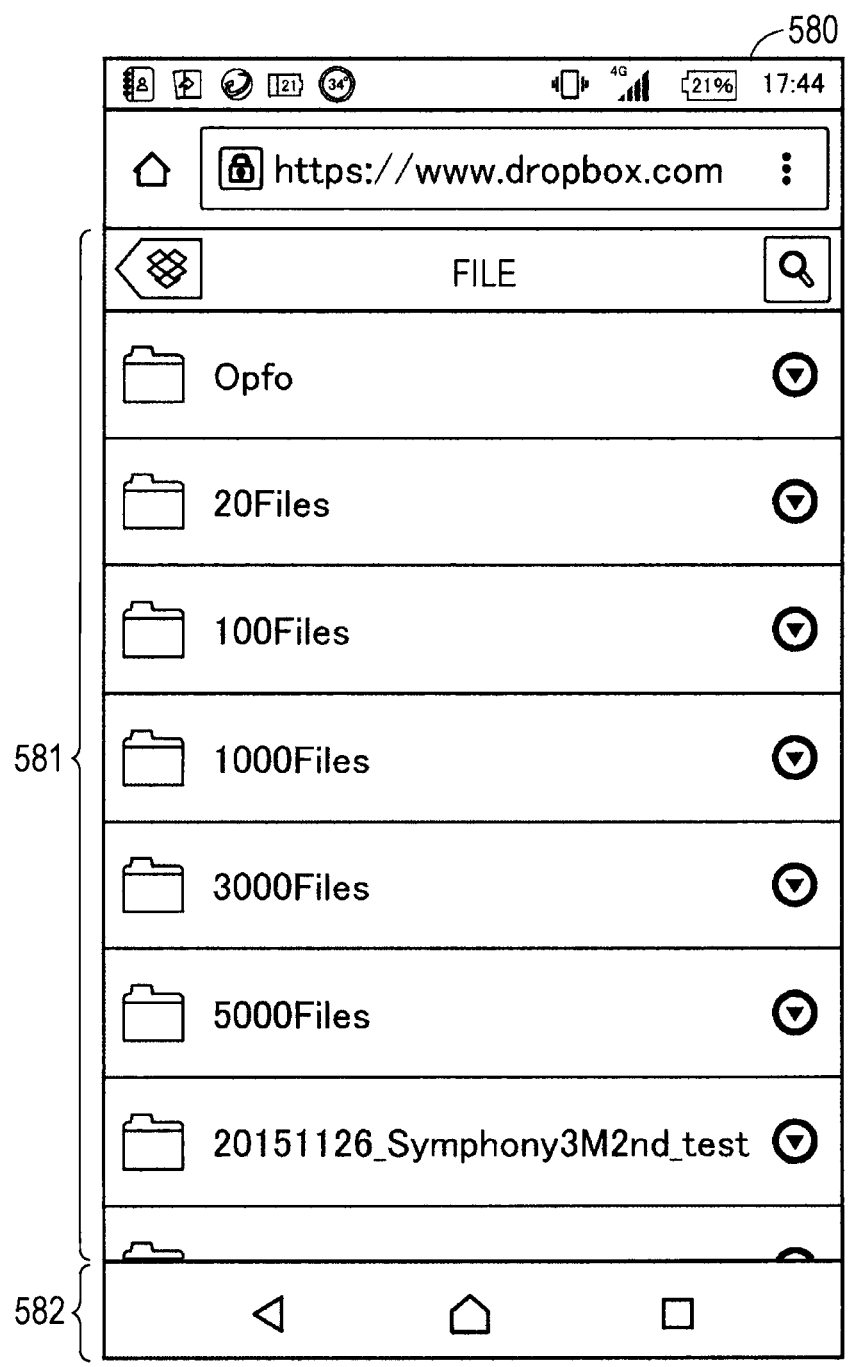
FIG. 26 is a drawing illustrating another example of a web page after the conversion in a case where the web page shown in FIG. 8 is displayed in each different OS.

The server PC 100 may convert a web page according to User-Agent of the MFP 200 to transmit the converted web page to the MFP 200. FIG. 25 is a drawing illustrating an example of a web page after the conversion in a case where the web page shown in FIG. 8 is displayed in another OS. FIG. 26 is a drawing illustrating an example of the web page after the conversion in a case where the web page shown in FIG. 8 is displayed in still another OS.

All of the screen 500 shown in FIG. 8, the screen 570 shown in FIG. 25, and the screen 580 shown in FIG. 26 are screens, each of which displays the contents of an online storage. The contents of the online storage includes a folder "Opfo", a folder "20Files", a folder "100Files", a folder "1000Files", and a folder "3000Files".

The screen 500 shown in FIG. 8 displays the contents of the online storage in the web page display area 510, and displays User-Agent specific elements such as the button 521.

The screen 570 shown in FIG. 25 displays the contents of the online storage in an area 571, and displays User-Agent specific elements such as a menu 572.

The screen 580 shown in FIG. 26 displays the contents of the online storage in an area 581, and displays User-Agent specific elements such as an operation button area 582.

The CPU 101 of the server PC 100 is capable of switching the web page shown in FIG. 8 to the mode shown in FIG. 25 or FIG. 26 according to a kind of User-Agent of the MFP 200.

Although embodiments of the present invention have been described and illustrated in detail, it is clearly understood that the same is by way of illustration and example only and not limitation, the scope of the present invention should be interpreted by terms of the appended claims. The scope of the present invention is intended to include all modifications within the meaning and range equivalent to the scope of the claims. In addition, the inventions described in the embodiments and modified examples are intended to be embodied independently or in combination as best one can.

What is claimed is:

1. An information processing device in which a first browser is installed, the information processing device comprising
a hardware processor that
determines whether or not a state of a displayed web page by the first browser conforms to predetermined criteria, the criteria include at least one of web page operation and web page elements,
when the displaying does not conform to the criteria, remotely operates a second browser installed in an information terminal, and
remotely operates the second browser on the information terminal to cause the second browser to display the web page on the information processing device,
the information processing device further comprising a storage that stores an image of the web page, wherein
when a difference between an image displayed by the second browser and the image stored in the storage exceeds a predetermined amount, the hardware processor determines that displaying of the web page by the second browser does not conform to the criteria.

2. The information processing device according to claim 1, wherein
when the first browser has executed processing for obtaining the web page, the hardware processor determines whether or not displaying of the web page conforms to the criteria.

3. The information processing device according to claim 1, wherein
after processing for obtaining the web page is executed, when operation for the web page has not been continuously performed for a predetermined period of time, the hardware processor determines that displaying of the web page does not conform to the criteria.

4. The information processing device according to claim 1, wherein
when a difference between an image displayed by the first browser and the image stored in the storage exceeds a predetermined amount, the hardware processor determines that displaying of the web page does not conform to the criteria.

5. The information processing device according to claim 1, wherein
the storage further stores:
an image of an element that is displayed by the first browser irrespective of the web page in the information processing device; and
coordinates at which the element is displayed.

6. The information processing device according to claim 5, wherein
according to whether or not the element is displayed, the hardware processor determines whether or not displaying of the web page conforms to the criteria.

7. The information processing device according to claim 5, wherein
according to whether or not the element is displayed at the coordinates, the hardware processor determines whether or not displaying of the web page conforms to the criteria.

8. The information processing device according to claim 4, wherein
the hardware processor adjusts a screen of the web page generated by the second browser so as to be adapted to the image stored in the storage.

9. The information processing device according to claim 1, wherein
the hardware processor transmits information that identifies a display environment in the information processing device to the second browser.

10. The information processing device according to claim 9, further comprising
a display that displays the web page, wherein
the information that identifies the display environment in the information processing device includes information that identifies a size of the display.

11. The information processing device according to claim 8, wherein
the information that identifies the display environment in the information processing device includes a User-Agent name of the first browser.

12. The information processing device according to claim 1, further comprising
a memory that stores a condition related to the web page, wherein
when displaying of the web page by the first browser meets the condition, the hardware processor determines that the displaying does not conform to the criteria.

13. The information processing device according to claim 12, wherein
the condition includes information that identifies a specific address, and
when the first browser accesses the specific address, the hardware processor determines that the displaying of the web page by the first browser does not conform to the criteria.

14. The information processing device according to claim 12, wherein
the condition includes information that identifies a specific application, and
when the specific application has been started, the hardware processor remotely operates the second browser to cause the second browser to display the web page on the information processing device.

15. The information processing device according to claim 1, wherein
when displaying of the web page by the first browser is in conjunction with execution of a given application, the hardware processor ends displaying by the second browser when the given application ends, and causes the first browser to display the web page.

16. The information processing device according to claim 1, wherein
when an update of the first browser is detected after the second browser is caused to display the web page, the hardware processor causes the first browser to display the web page again.

17. The information processing device according to claim 1, wherein
when displaying of the web page by the second browser does not conform to the criteria, the hardware processor transmits information that prompts updating of the second browser to the information terminal.

18. The information processing device according to claim 1, wherein
when displaying of the web page by the second browser does not conform to the criteria, the hardware processor remotely operates a third browser to cause the third browser to display the web page.

19. The information processing device according to claim 1, wherein
the second browser is configured to access predetermined display content in the information processing device at a starting time.

20. The information processing device according to claim 19, wherein
the predetermined display content is content to be redirected to the web page for which it is determined that displaying by the first browser does not conform to the criteria.

21. The information processing device according to claim 1, wherein
the hardware processor
is realized by a processor, and
when a load factor of the processor becomes a certain threshold value or more while the web page is displayed by the first browser, determines that displaying of the web page by the first browser conforms to the criteria.

22. The information processing device according to claim 1, wherein
the hardware processor:
when a predetermined application has been started, outputs information for accepting selection from a user, as a browser for displaying a web page, between the first browser and the second browser.

23. The information processing device according to claim 22, wherein
the hardware processor remotely operates the second browser by a remote desktop function.

24. The information processing device according to claim 22, wherein
the information processing device is integrally configured with the information terminal.

25. The information processing device according to claim 22, wherein
the information processing device is configured independently from the information terminal.

26. A non-transitory recording medium storing a computer readable program that is executed by a computer of an information processing device in which a first browser is installed, the program causing the computer to perform:
determining whether or not displaying of a web page by the first browser conforms to predetermined criteria, the criteria include at least one of web page operation and web page elements; and
when the displaying does not conform to the criteria, remotely operating a second browser installed in an information terminal to cause the second browser to display the web page on the information processing device, wherein
when a difference between an image displayed by the second browser and a stored image exceeds a predetermined amount, the hardware processor determines that displaying of the web page by the second browser does not conform to the criteria.

27. The non-transitory recording medium according to claim 26, the program causing the computer to perform:
when a predetermined application has been started, outputting information for accepting selection from a user, as a browser for displaying a web page, between the first browser and the second browser installed in the information terminal.

28. The non-transitory recording medium according to claim 27, wherein
the hardware processor remotely operates the second browser by a remote desktop function.

29. The non-transitory recording medium according to claim 27, wherein
the information processing device is integrally configured with the information terminal.

30. The non-transitory recording medium according to claim 27, wherein
the information processing device is configured independently from the information terminal.

* * * * *